US009462604B2

(12) United States Patent
Das et al.

(10) Patent No.: US 9,462,604 B2
(45) Date of Patent: Oct. 4, 2016

(54) METHODS AND APPARATUS RELATED TO SELECTING A REQUEST GROUP FOR A REQUEST REPORT

(75) Inventors: Arnab Das, Summit, NJ (US); Samel Celebi, Basking Ridge, NJ (US); Yunus Hussain, Bridgewater, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 928 days.

(21) Appl. No.: 11/609,627

(22) Filed: Dec. 12, 2006

(65) Prior Publication Data
US 2007/0253357 A1    Nov. 1, 2007

Related U.S. Application Data

(63) Continuation-in-part of application No. 11/333,792, filed on Jan. 17, 2006.

(60) Provisional application No. 60/752,973, filed on Dec. 22, 2005.

(51) Int. Cl.
*H04W 72/00* (2009.01)
*H04W 72/12* (2009.01)
*H04L 12/801* (2013.01)
*H04W 28/18* (2009.01)
(Continued)

(52) U.S. Cl.
CPC .......... *H04W 72/1284* (2013.01); *H04L 47/10* (2013.01); *H04W 28/18* (2013.01);
(Continued)

(58) Field of Classification Search
CPC .............. H04L 47/10; H04L 12/5693; H04L 2012/5651; H04L 1/0018; H04L 1/1621; H04L 1/1642; H04L 1/1809; H04L 1/1854; H04L 2001/0096; H04W 72/1268; H04W 24/08; H04W 28/06; H04W 40/12; H04W 72/1278; H04W 72/1284
USPC ............. 370/229, 231, 294, 395.4, 328–338; 455/450, 464, 452.1–452.2, 455/422.1–426.2, 466, 434, 67.11, 115.1, 455/226.1
See application file for complete search history.

(56) References Cited

U.S. PATENT DOCUMENTS 4,631,720 A    12/1986    Koeck
4,660,196 A    4/1987    Gray et al.
(Continued)

FOREIGN PATENT DOCUMENTS

CL    3603-2006    12/2006
CL    3604-2006    12/2006
(Continued)

OTHER PUBLICATIONS

Kwon, et al., "Quasi-Dedicated Access Scheme for Uplink Realtime Services in Future Wireless Communication Systems," Vehicular Technology Conference, 2005. VTC 2005-Spring. 2005 IEEE 61st Stockholm, Sweden. Apr. 20-May 1, 2005, Piscataway, NJ, USA, May 30, 2005. pp. 3117-3121.
(Continued)

*Primary Examiner* — Quan M Hua
(74) *Attorney, Agent, or Firm* — Ashish L. Patel

(57) ABSTRACT

Methods and apparatus related to reporting transmission backlog information are described. A wireless communications device maintains and updates transmission backlog information corresponding to a plurality of different transmission request groups. Different request groups may correspond to different uplink traffic queues. For a request reporting opportunity, the communications device selects a request group from among the plurality of different transmission request groups as a function of: request group changes in backlog with respect to previously reported requests, the changes taking into consideration base station allocation of transmission resources; and request group priority information. A request report is generated conveying backlog information corresponding to the selected request group, and the generated report is transmitted over a wireless communications link.

43 Claims, 19 Drawing Sheets

(51) Int. Cl.
  *H04L 1/06*    (2006.01)
  *H04L 27/00*   (2006.01)
  *H04L 27/26*   (2006.01)
  *H04L 1/00*    (2006.01)
  *H04W 24/10*   (2009.01)
  *H04W 28/02*   (2009.01)
  *H04W 28/12*   (2009.01)
  *H04W 28/24*   (2009.01)

(52) U.S. Cl.
  CPC .......... *H04W72/005* (2013.01); *H04L 1/0026* (2013.01); *H04L 1/0073* (2013.01); *H04L 1/0687* (2013.01); *H04L 1/0693* (2013.01); *H04L 27/2602* (2013.01); *H04L 27/2646* (2013.01); *H04L 2027/002* (2013.01); *H04W 24/10* (2013.01); *H04W 28/0278* (2013.01); *H04W 28/12* (2013.01); *H04W 28/24* (2013.01); *H04W 72/1221* (2013.01); *H04W 72/1236* (2013.01); *H04W 72/1242* (2013.01); *H04W 72/1252* (2013.01)

(56) References Cited

U.S. PATENT DOCUMENTS

| | | |
|---|---|---|
| 4,679,244 A | 7/1987 | Kawasaki et al. |
| 4,833,701 A | 5/1989 | Comroe et al. |
| 5,128,938 A | 7/1992 | Borras |
| 5,203,013 A | 4/1993 | Breeden et al. |
| 5,387,905 A | 2/1995 | Grube et al. |
| 5,434,848 A | 7/1995 | Chimento, Jr. et al. |
| 5,461,645 A | 10/1995 | Ishii |
| 5,465,389 A | 11/1995 | Agrawal et al. |
| 5,491,837 A | 2/1996 | Haartsen |
| 5,506,865 A | 4/1996 | Weaver, Jr. |
| 5,537,414 A | 7/1996 | Takiyasu et al. |
| 5,579,307 A | 11/1996 | Richetta et al. |
| 5,732,328 A | 3/1998 | Mitra et al. |
| 5,835,847 A | 11/1998 | Gilmore et al. |
| 5,867,478 A | 2/1999 | Baum et al. |
| 5,898,925 A | 4/1999 | Honkasalo et al. |
| 5,914,950 A | 6/1999 | Tiedemann et al. |
| 5,915,221 A | 6/1999 | Sawyer et al. |
| 5,923,650 A | 7/1999 | Chen et al. |
| 5,933,421 A | 8/1999 | Alamouti et al. |
| 5,940,771 A | 8/1999 | Gollnick et al. |
| 5,966,657 A | 10/1999 | Sporre |
| 5,966,662 A | 10/1999 | Murto |
| 5,978,657 A | 11/1999 | Suzuki |
| 5,999,534 A | 12/1999 | Kim |
| 6,002,676 A | 12/1999 | Fleming |
| 6,004,276 A | 12/1999 | Wright et al. |
| 6,026,081 A | 2/2000 | Hamabe et al. |
| 6,028,842 A | 2/2000 | Chapman et al. |
| 6,028,843 A * | 2/2000 | Delp et al. .................... 370/235 |
| 6,035,000 A | 3/2000 | Bingham et al. |
| 6,069,871 A | 5/2000 | Sharma et al. |
| 6,070,072 A | 5/2000 | Dorenbosch et al. |
| 6,073,025 A | 6/2000 | Chheda et al. |
| 6,075,025 A | 6/2000 | Bishop et al. |
| 6,122,270 A | 9/2000 | Whinnett et al. |
| 6,128,506 A | 10/2000 | Knutsson et al. |
| 6,131,016 A | 10/2000 | Greenstein et al. |
| 6,141,565 A | 10/2000 | Feuerstein et al. |
| 6,169,896 B1 | 1/2001 | Sant et al. |
| 6,173,005 B1 | 1/2001 | Kotzin et al. |
| 6,181,948 B1 | 1/2001 | Kondo |
| 6,201,793 B1 | 3/2001 | Chen et al. |
| 6,205,129 B1 | 3/2001 | Esteves et al. |
| 6,215,791 B1 | 4/2001 | Kim |
| 6,236,646 B1 | 5/2001 | Beming et al. |
| 6,256,478 B1 | 7/2001 | Allen et al. |
| 6,259,927 B1 | 7/2001 | Butovitsch et al. |
| 6,263,392 B1 | 7/2001 | McCauley |
| 6,298,233 B1 | 10/2001 | Souissi et al. |
| 6,308,080 B1 | 10/2001 | Burt et al. |
| 6,310,857 B1 * | 10/2001 | Duffield et al. ................ 370/232 |
| 6,311,065 B1 | 10/2001 | Ushiki et al. |
| 6,374,085 B1 | 4/2002 | Saints et al. |
| 6,377,583 B1 | 4/2002 | Lyles et al. |
| 6,377,955 B1 | 4/2002 | Hartmann et al. |
| 6,405,047 B1 | 6/2002 | Moon |
| 6,414,946 B1 | 7/2002 | Satou et al. |
| 6,445,917 B1 | 9/2002 | Bark et al. |
| 6,453,151 B1 | 9/2002 | Kiang et al. |
| 6,493,539 B1 | 12/2002 | Falco et al. |
| 6,526,281 B1 | 2/2003 | Gorsuch et al. |
| 6,538,986 B2 | 3/2003 | Isaksson et al. |
| 6,545,999 B1 | 4/2003 | Sugita |
| 6,553,336 B1 | 4/2003 | Johnson et al. |
| 6,590,890 B1 | 7/2003 | Stolyar et al. |
| 6,600,903 B1 | 7/2003 | Lilja et al. |
| 6,609,007 B1 | 8/2003 | Eibling et al. |
| 6,621,808 B1 | 9/2003 | Sadri |
| 6,625,133 B1 | 9/2003 | Balachandran et al. |
| 6,662,024 B2 | 12/2003 | Walton et al. |
| 6,671,512 B2 | 12/2003 | Laakso et al. |
| 6,680,909 B1 | 1/2004 | Bansal et al. |
| 6,697,417 B2 | 2/2004 | Fernandez-Corbaton et al. |
| 6,710,651 B2 | 3/2004 | Forrester |
| 6,742,020 B1 | 5/2004 | Dimitroff et al. |
| 6,745,003 B1 | 6/2004 | Maca et al. |
| 6,745,044 B1 | 6/2004 | Holtzman et al. |
| 6,751,187 B2 | 6/2004 | Walton et al. |
| 6,771,934 B2 | 8/2004 | Demers et al. |
| 6,788,963 B2 | 9/2004 | Laroia et al. |
| 6,798,761 B2 | 9/2004 | Cain et al. |
| 6,804,289 B2 | 10/2004 | Takahashi |
| 6,804,521 B2 | 10/2004 | Tong et al. |
| 6,816,476 B2 | 11/2004 | Kim et al. |
| 6,836,673 B1 | 12/2004 | Trott |
| 6,865,168 B1 | 3/2005 | Sekine |
| 6,889,056 B2 | 5/2005 | Shibutani |
| 6,889,257 B1 | 5/2005 | Patel |
| 6,892,071 B2 | 5/2005 | Park et al. |
| 6,895,005 B1 | 5/2005 | Malin et al. |
| 6,895,364 B2 | 5/2005 | Banfer |
| 6,901,268 B2 | 5/2005 | Chang et al. |
| 6,901,270 B1 | 5/2005 | Beach |
| 6,904,016 B2 | 6/2005 | Kuo et al. |
| 6,912,405 B2 | 6/2005 | Hiramatsu et al. |
| 6,917,607 B1 | 7/2005 | Yeom et al. |
| 6,940,827 B2 | 9/2005 | Li et al. |
| 6,954,643 B2 | 10/2005 | Petrus et al. |
| 6,957,072 B2 | 10/2005 | Kangras et al. |
| 6,967,937 B1 | 11/2005 | Gormley |
| 6,968,156 B2 | 11/2005 | Sugaya et al. |
| 7,006,841 B2 | 2/2006 | Monogioudis et al. |
| 7,024,460 B2 | 4/2006 | Koopmas et al. |
| 7,027,782 B2 | 4/2006 | Moon et al. |
| 7,031,983 B2 | 4/2006 | Israni et al. |
| 7,034,254 B2 | 4/2006 | Grabowski et al. |
| 7,039,029 B2 | 5/2006 | Lee et al. |
| 7,043,254 B2 | 5/2006 | Chawla et al. |
| 7,047,009 B2 | 5/2006 | Laroia et al. |
| 7,054,643 B2 | 5/2006 | Trossen et al. |
| 7,061,885 B2 | 6/2006 | Kurtz |
| 7,092,672 B1 | 8/2006 | Pekonen et al. |
| 7,120,123 B1 | 10/2006 | Quigley et al. |
| 7,120,448 B2 | 10/2006 | Brouwer et al. |
| 7,123,910 B2 | 10/2006 | Lucidarme et al. |
| 7,139,536 B2 | 11/2006 | Chiu |
| 7,142,548 B2 | 11/2006 | Fong et al. |
| 7,146,172 B2 | 12/2006 | Li et al. |
| 7,158,796 B2 | 1/2007 | Tiedemann, Jr. et al. |
| 7,161,909 B2 * | 1/2007 | Sharma ...................... 370/235 |
| 7,162,203 B2 | 1/2007 | Brunner et al. |
| 7,164,883 B2 | 1/2007 | Rappaport et al. |
| 7,197,025 B2 | 3/2007 | Chuah |
| 7,203,493 B2 | 4/2007 | Fujii et al. |
| 7,212,821 B2 | 5/2007 | Laroia et |
| 7,218,948 B2 | 5/2007 | Laroia et al. |
| 7,245,935 B2 | 7/2007 | Lin |

(56) References Cited

U.S. PATENT DOCUMENTS

| | | |
|---|---|---|
| 7,260,054 B2 | 8/2007 | Olszewski et al. |
| 7,269,406 B2 | 9/2007 | Qi |
| 7,277,709 B2 | 10/2007 | Vadgama |
| 7,277,737 B1 | 10/2007 | Vollmer et al. |
| 7,280,814 B2 | 10/2007 | Austin et al. |
| 7,283,559 B2 | 10/2007 | Cho et al. |
| 7,283,836 B2 | 10/2007 | Hwang et al. |
| 7,299,277 B1 | 11/2007 | Moran et al. |
| 7,317,921 B2 | 1/2008 | Mueckenheim et al. |
| 7,319,680 B2 | 1/2008 | Cho |
| 7,321,563 B2 | 1/2008 | Kim et al. |
| 7,340,267 B2 | 3/2008 | Budka et al. |
| 7,349,667 B2 | 3/2008 | Magee et al. |
| 7,356,635 B2 | 4/2008 | Woodings et al. |
| 7,362,702 B2 | 4/2008 | Terrell et al. |
| 7,382,755 B2 | 6/2008 | Dugad et al. |
| 7,395,058 B1 | 7/2008 | Kalofonos et al. |
| 7,397,803 B2 | 7/2008 | Love et al. |
| 7,400,901 B2 | 7/2008 | Kostic et al. |
| 7,412,265 B2 | 8/2008 | Chen et al. |
| 7,418,260 B2 | 8/2008 | Lucidarme |
| 7,430,206 B2 | 9/2008 | Terry et al. |
| 7,430,207 B2 | 9/2008 | Wu et al. |
| 7,430,420 B2 | 9/2008 | Derakhshan et al. |
| 7,463,577 B2 | 12/2008 | Sudo et al. |
| 7,486,620 B2 | 2/2009 | Seol |
| 7,486,638 B2 | 2/2009 | Ofuji et al. |
| 7,502,614 B2 | 3/2009 | Uchida et al. |
| 7,508,792 B2 | 3/2009 | Petrovic et al. |
| 7,510,828 B2 | 3/2009 | Lynn et al. |
| 7,512,076 B2 | 3/2009 | Kwon et al. |
| 7,512,185 B2 | 3/2009 | Sharon et al. |
| 7,519,013 B2 | 4/2009 | Destino et al. |
| 7,519,033 B2 | 4/2009 | Soomro |
| 7,522,544 B2 | 4/2009 | Cheng et al. |
| 7,525,971 B2 | 4/2009 | Carroll et al. |
| 7,526,091 B2 | 4/2009 | Jeong et al. |
| 7,558,235 B2 | 7/2009 | Lester et al. |
| 7,558,572 B2 | 7/2009 | Anigstein |
| 7,561,893 B2 | 7/2009 | Moulsley et al. |
| 7,668,573 B2 | 2/2010 | Laroia et al. |
| 7,743,284 B1 | 6/2010 | Taylor et al. |
| 8,040,831 B2 | 10/2011 | Kurtz et al. |
| RE43,593 E | 8/2012 | Kayama et al. |
| 8,325,621 B2 | 12/2012 | Simonsson et al. |
| 2001/0007552 A1 | 7/2001 | Schiff et al. |
| 2001/0036181 A1 | 11/2001 | Rogers |
| 2001/0046878 A1 | 11/2001 | Chang et al. |
| 2001/0055293 A1 | 12/2001 | Parsa et al. |
| 2002/0012326 A1 | 1/2002 | Chang et al. |
| 2002/0031105 A1 | 3/2002 | Zeira et al. |
| 2002/0037729 A1 | 3/2002 | Kitazawa et al. |
| 2002/0045448 A1 | 4/2002 | Park et al. |
| 2002/0049040 A1 | 4/2002 | Sugaya et al. |
| 2002/0075835 A1 | 6/2002 | Krishnakumar et al. |
| 2002/0077140 A1 | 6/2002 | Monogioudis et al. |
| 2002/0080967 A1 | 6/2002 | Abdo et al. |
| 2002/0082011 A1 | 6/2002 | Fujii et al. |
| 2002/0085516 A1 | 7/2002 | Bridgelall |
| 2002/0093953 A1 | 7/2002 | Naim et al. |
| 2002/0107028 A1 | 8/2002 | Rantalainen et al. |
| 2002/0122431 A1 | 9/2002 | Cho et al. |
| 2002/0136195 A1 | 9/2002 | Kurtz et al. |
| 2002/0142788 A1 | 10/2002 | Chawla et al. |
| 2002/0143858 A1 | 10/2002 | Teague et al. |
| 2002/0147017 A1 | 10/2002 | Li et al. |
| 2002/0160802 A1 | 10/2002 | Hiramatsu et al. |
| 2002/0177452 A1 | 11/2002 | Ruutu et al. |
| 2002/0186678 A1 | 12/2002 | Averbuch et al. |
| 2003/0003921 A1 | 1/2003 | Laakso et al. |
| 2003/0007498 A1 | 1/2003 | Angle et al. |
| 2003/0012212 A1 | 1/2003 | Earnshaw et al. |
| 2003/0016641 A1 | 1/2003 | Terry et al. |
| 2003/0027587 A1 | 2/2003 | Proctor, Jr. et al. |
| 2003/0028606 A1 | 2/2003 | Koopmans et al. |
| 2003/0064737 A1 | 4/2003 | Eriksson et al. |
| 2003/0078067 A1 | 4/2003 | Kim et al. |
| 2003/0095519 A1 | 5/2003 | Kuo et al. |
| 2003/0100269 A1 | 5/2003 | Lehtinen et al. |
| 2003/0114180 A1 | 6/2003 | Black et al. |
| 2003/0123396 A1 | 7/2003 | Seo et al. |
| 2003/0123410 A1 | 7/2003 | Youm |
| 2003/0139197 A1 | 7/2003 | Kostic et al. |
| 2003/0144042 A1 | 7/2003 | Weinfield et al. |
| 2003/0157899 A1 | 8/2003 | Trossen et al. |
| 2003/0161285 A1 | 8/2003 | Tiedemann et al. |
| 2003/0169705 A1 | 9/2003 | Knisely et al. |
| 2003/0185224 A1 | 10/2003 | Ramanan et al. |
| 2003/0185285 A1 | 10/2003 | Talwar |
| 2003/0193915 A1 | 10/2003 | Lee et al. |
| 2003/0198204 A1 | 10/2003 | Taneja et al. |
| 2003/0198206 A1 | 10/2003 | Cain et al. |
| 2003/0206541 A1 | 11/2003 | Yun et al. |
| 2003/0207691 A1 | 11/2003 | Chen |
| 2003/0207693 A1 | 11/2003 | Roderique |
| 2003/0214906 A1 | 11/2003 | Hu et al. |
| 2003/0214928 A1 | 11/2003 | Chuah et al. |
| 2003/0223354 A1 | 12/2003 | Olszewski et al. |
| 2004/0001429 A1 | 1/2004 | Ma et al. |
| 2004/0004954 A1 | 1/2004 | Terry et al. |
| 2004/0013103 A1 | 1/2004 | Zhang et al. |
| 2004/0057402 A1 | 3/2004 | Ramos et al. |
| 2004/0062206 A1 | 4/2004 | Soong et al. |
| 2004/0081089 A1 | 4/2004 | Ayyagari |
| 2004/0082344 A1 | 4/2004 | Moilanen et al. |
| 2004/0085936 A1 | 5/2004 | Gopalakrishnan et al. |
| 2004/0091026 A1 | 5/2004 | Nakayama |
| 2004/0111640 A1 | 6/2004 | Baum |
| 2004/0120411 A1 | 6/2004 | Walton et al. |
| 2004/0125776 A1 | 7/2004 | Haugli et al. |
| 2004/0127226 A1* | 7/2004 | Dugad et al. ................. 455/450 |
| 2004/0131007 A1 | 7/2004 | Smee et al. |
| 2004/0141466 A1 | 7/2004 | Kim et al. |
| 2004/0147262 A1 | 7/2004 | Lescuyer et al. |
| 2004/0147276 A1 | 7/2004 | Gholmieh et al. |
| 2004/0160922 A1 | 8/2004 | Nanda et al. |
| 2004/0162097 A1 | 8/2004 | Vijayan et al. |
| 2004/0166869 A1 | 8/2004 | Laroia et al. |
| 2004/0166886 A1 | 8/2004 | Laroia et al. |
| 2004/0166887 A1 | 8/2004 | Laroia et al. |
| 2004/0171401 A1 | 9/2004 | Balachandran et al. |
| 2004/0180658 A1 | 9/2004 | Uchida et al. |
| 2004/0184410 A1 | 9/2004 | Park |
| 2004/0192371 A1 | 9/2004 | Zhao et al. |
| 2004/0196802 A1 | 10/2004 | Bae et al. |
| 2004/0203717 A1 | 10/2004 | Wingrowicz et al. |
| 2004/0203981 A1 | 10/2004 | Budka et al. |
| 2004/0218617 A1 | 11/2004 | Sagfors |
| 2004/0223455 A1 | 11/2004 | Fong et al. |
| 2004/0224677 A1 | 11/2004 | Kuchibhotla et al. |
| 2004/0228313 A1 | 11/2004 | Cheng et al. |
| 2004/0233838 A1 | 11/2004 | Sudo et al. |
| 2004/0235510 A1 | 11/2004 | Elicegui et al. |
| 2004/0248518 A1 | 12/2004 | Kashiwase et al. |
| 2004/0248568 A1 | 12/2004 | Lucidarme et al. |
| 2004/0252647 A1 | 12/2004 | Chang et al. |
| 2004/0252662 A1 | 12/2004 | Cho et al. |
| 2004/0253996 A1 | 12/2004 | Chen et al. |
| 2004/0258040 A1 | 12/2004 | Joshi et al. |
| 2004/0259546 A1 | 12/2004 | Balachandran et al. |
| 2004/0264414 A1 | 12/2004 | Dorenbosch |
| 2004/0266474 A1 | 12/2004 | Petrus et al. |
| 2005/0003847 A1 | 1/2005 | Love et al. |
| 2005/0008892 A1 | 1/2005 | Yamamoto et al. |
| 2005/0047344 A1 | 3/2005 | Seol et al. |
| 2005/0047393 A1 | 3/2005 | Liu et al. |
| 2005/0047416 A1 | 3/2005 | Heo et al. |
| 2005/0053099 A1 | 3/2005 | Spear et al. |
| 2005/0058637 A1 | 3/2005 | Lynn et al. |
| 2005/0064821 A1 | 3/2005 | Hedberg et al. |
| 2005/0068922 A1 | 3/2005 | Jalali |
| 2005/0085197 A1 | 4/2005 | Laroia et al. |
| 2005/0099987 A1 | 5/2005 | Lester et al. |
| 2005/0111361 A1 | 5/2005 | Hosein |

(56) References Cited

U.S. PATENT DOCUMENTS

| | | |
|---|---|---|
| 2005/0118993 A1 | 6/2005 | Roux et al. |
| 2005/0122900 A1 | 6/2005 | Tuulos et al. |
| 2005/0128999 A1 | 6/2005 | Kwon et al. |
| 2005/0135320 A1 | 6/2005 | Tiedemann et al. |
| 2005/0136937 A1 | 6/2005 | Qian et al. |
| 2005/0143084 A1 | 6/2005 | Cheng et al. |
| 2005/0143114 A1 | 6/2005 | Moulsley et al. |
| 2005/0152320 A1 | 7/2005 | Marinier et al. |
| 2005/0157803 A1 | 7/2005 | Kim et al. |
| 2005/0157876 A1 | 7/2005 | Jeong et al. |
| 2005/0170782 A1 | 8/2005 | Rong et al. |
| 2005/0181732 A1 | 8/2005 | Kang et al. |
| 2005/0185632 A1 | 8/2005 | Draves et al. |
| 2005/0195765 A1 | 9/2005 | Sharon et al. |
| 2005/0201331 A1 | 9/2005 | Gaal et al. |
| 2005/0201353 A1 | 9/2005 | Lee et al. |
| 2005/0207335 A1 | 9/2005 | Schmidl et al. |
| 2005/0207359 A1 | 9/2005 | Hwang et al. |
| 2005/0207373 A1 | 9/2005 | Roy et al. |
| 2005/0220052 A1 | 10/2005 | Uehara et al. |
| 2005/0232154 A1 | 10/2005 | Bang et al. |
| 2005/0243938 A1 | 11/2005 | Armstrong et al. |
| 2005/0249118 A1 | 11/2005 | Terry et al. |
| 2005/0250509 A1* | 11/2005 | Choksi ................ 455/452.1 |
| 2005/0250510 A1 | 11/2005 | Kaikkonen et al. |
| 2005/0250529 A1 | 11/2005 | Funnell et al. |
| 2005/0255873 A1 | 11/2005 | Zhang et al. |
| 2005/0259662 A1 | 11/2005 | Kim et al. |
| 2005/0265301 A1 | 12/2005 | Heo et al. |
| 2005/0281232 A1 | 12/2005 | Kim et al. |
| 2005/0281278 A1 | 12/2005 | Black et al. |
| 2005/0289256 A1 | 12/2005 | Cudak et al. |
| 2006/0003767 A1 | 1/2006 | Kim et al. |
| 2006/0015357 A1 | 1/2006 | Cagan |
| 2006/0018284 A1 | 1/2006 | Rudolf et al. |
| 2006/0019694 A1 | 1/2006 | Sutivong et al. |
| 2006/0034174 A1 | 2/2006 | Nishibayashi et al. |
| 2006/0040696 A1 | 2/2006 | Lin et al. |
| 2006/0045013 A1 | 3/2006 | Vannithamby et al. |
| 2006/0056346 A1 | 3/2006 | Vadgama et al. |
| 2006/0073836 A1 | 4/2006 | Laroia et al. |
| 2006/0079257 A1 | 4/2006 | Iochi et al. |
| 2006/0079267 A1 | 4/2006 | Kim et al. |
| 2006/0083161 A1 | 4/2006 | Laroia et al. |
| 2006/0089104 A1 | 4/2006 | Kaikkonen et al. |
| 2006/0092881 A1 | 5/2006 | Laroia et al. |
| 2006/0104240 A1 | 5/2006 | Sebire et al. |
| 2006/0120470 A1 | 6/2006 | Hwang et al. |
| 2006/0126497 A1 | 6/2006 | Na et al. |
| 2006/0128410 A1 | 6/2006 | Derryberry et al. |
| 2006/0128412 A1 | 6/2006 | Mantha et al. |
| 2006/0133346 A1 | 6/2006 | Chheda et al. |
| 2006/0135193 A1 | 6/2006 | Ratasuk et al. |
| 2006/0140154 A1 | 6/2006 | Kwak et al. |
| 2006/0142032 A1 | 6/2006 | Derakhshan et al. |
| 2006/0164981 A1 | 7/2006 | Olsson et al. |
| 2006/0165029 A1 | 7/2006 | Melpignano et al. |
| 2006/0176807 A1 | 8/2006 | Wu et al. |
| 2006/0182022 A1 | 8/2006 | Abedi |
| 2006/0203765 A1 | 9/2006 | Laroia et al. |
| 2006/0205356 A1 | 9/2006 | Laroia et al. |
| 2006/0205396 A1* | 9/2006 | Laroia et al. ............ 455/422.1 |
| 2006/0215604 A1 | 9/2006 | Mueckenheim et al. |
| 2006/0234722 A1 | 10/2006 | Hanebeck et al. |
| 2006/0245452 A1 | 11/2006 | Frederiksen et al. |
| 2006/0246916 A1 | 11/2006 | Cheng et al. |
| 2006/0256747 A1 | 11/2006 | Jaakkola |
| 2006/0270399 A1 | 11/2006 | Qi et al. |
| 2006/0285481 A1 | 12/2006 | Lane et al. |
| 2006/0287743 A1 | 12/2006 | Sampath et al. |
| 2007/0002757 A1 | 1/2007 | Soomro et al. |
| 2007/0002806 A1 | 1/2007 | Soomro et al. |
| 2007/0010226 A1 | 1/2007 | Laroia et al. |
| 2007/0015541 A1 | 1/2007 | Dominique et al. |
| 2007/0026803 A1 | 2/2007 | Malm |
| 2007/0026808 A1 | 2/2007 | Love et al. |
| 2007/0026810 A1 | 2/2007 | Love et al. |
| 2007/0030828 A1 | 2/2007 | Vimpari et al. |
| 2007/0036116 A1 | 2/2007 | Eiger et al. |
| 2007/0054624 A1 | 3/2007 | Kashiwagi |
| 2007/0057952 A1 | 3/2007 | Swedberg et al. |
| 2007/0066273 A1 | 3/2007 | Laroia et al. |
| 2007/0070894 A1 | 3/2007 | Wang et al. |
| 2007/0081492 A1 | 4/2007 | Petrovic et al. |
| 2007/0081498 A1 | 4/2007 | Niwano |
| 2007/0104128 A1* | 5/2007 | Laroia et al. ................ 370/329 |
| 2007/0104164 A1 | 5/2007 | Laroia et al. |
| 2007/0109999 A1 | 5/2007 | Brunner |
| 2007/0133412 A1 | 6/2007 | Hutter et al. |
| 2007/0140168 A1 | 6/2007 | Laroia et al. |
| 2007/0140179 A1 | 6/2007 | Zhang et al. |
| 2007/0141994 A1 | 6/2007 | Cheng et al. |
| 2007/0147283 A1 | 6/2007 | Laroia et al. |
| 2007/0147377 A1 | 6/2007 | Laroia et al. |
| 2007/0149126 A1 | 6/2007 | Rangan et al. |
| 2007/0149128 A1 | 6/2007 | Das et al. |
| 2007/0149129 A1 | 6/2007 | Das et al. |
| 2007/0149131 A1 | 6/2007 | Li et al. |
| 2007/0149132 A1 | 6/2007 | Li et al. |
| 2007/0149137 A1 | 6/2007 | Richardson et al. |
| 2007/0149138 A1 | 6/2007 | Das et al. |
| 2007/0149194 A1 | 6/2007 | Das et al. |
| 2007/0149227 A1 | 6/2007 | Parizhsky et al. |
| 2007/0149228 A1 | 6/2007 | Das |
| 2007/0149238 A1 | 6/2007 | Das et al. |
| 2007/0159969 A1 | 7/2007 | Das et al. |
| 2007/0168326 A1 | 7/2007 | Das et al. |
| 2007/0169326 A1 | 7/2007 | Das et al. |
| 2007/0173208 A1 | 7/2007 | Nishio et al. |
| 2007/0177510 A1 | 8/2007 | Natarajan et al. |
| 2007/0183308 A1 | 8/2007 | Korobkov et al. |
| 2007/0213087 A1 | 9/2007 | Laroia et al. |
| 2007/0243882 A1 | 10/2007 | Edge |
| 2007/0249287 A1 | 10/2007 | Das et al. |
| 2007/0249360 A1 | 10/2007 | Das et al. |
| 2007/0253355 A1 | 11/2007 | Hande et al. |
| 2007/0253358 A1 | 11/2007 | Das et al. |
| 2007/0253385 A1 | 11/2007 | Li et al. |
| 2007/0253449 A1 | 11/2007 | Das et al. |
| 2007/0258365 A1 | 11/2007 | Das et al. |
| 2008/0031368 A1 | 2/2008 | Lindoff et al. |
| 2008/0037474 A1 | 2/2008 | Niwano |
| 2008/0051086 A2 | 2/2008 | Etemad et al. |
| 2008/0057969 A1 | 3/2008 | Agami et al. |
| 2008/0076462 A1 | 3/2008 | Iochi et al. |
| 2008/0144521 A1 | 6/2008 | Soomro et al. |
| 2008/0159235 A1 | 7/2008 | Son et al. |
| 2008/0167047 A1 | 7/2008 | Abedi |
| 2008/0212524 A1 | 9/2008 | Niwano |
| 2009/0004983 A1 | 1/2009 | Darabi |
| 2009/0034455 A1 | 2/2009 | Lee et al. |
| 2009/0103507 A1 | 4/2009 | Gu et al. |
| 2009/0106507 A1 | 4/2009 | Gu et al. |
| 2009/0252122 A1 | 10/2009 | Leinonen et al. |
| 2009/0303900 A1 | 12/2009 | Cho et al. |
| 2010/0177731 A1 | 7/2010 | Ananthaiyer et al. |
| 2010/0220626 A1 | 9/2010 | Das et al. |
| 2011/0090812 A1 | 4/2011 | Aoyama |
| 2011/0149789 A1 | 6/2011 | Edge |
| 2012/0140756 A1 | 6/2012 | Rudolf et al. |
| 2013/0230027 A1 | 9/2013 | Das et al. |
| 2013/0242888 A1 | 9/2013 | Das et al. |
| 2015/0043374 A1 | 2/2015 | Hande et al. |
| 2015/0333948 A1 | 11/2015 | Richardson |
| 2015/0334590 A1 | 11/2015 | Das |

FOREIGN PATENT DOCUMENTS

| | | |
|---|---|---|
| CL | 3605-2006 | 12/2006 |
| CN | 1159262 A | 9/1997 |
| CN | 1159286 A | 9/1997 |
| CN | 1265792 | 9/2000 |
| CN | 1286006 A | 2/2001 |
| CN | 1286821 A | 3/2001 |

(56) References Cited

FOREIGN PATENT DOCUMENTS

| | | |
|---|---|---|
| CN | 1286832 A | 3/2001 |
| CN | 1316140 | 10/2001 |
| CN | 1335036 A | 2/2002 |
| CN | 1338877 A | 3/2002 |
| CN | 1338878 A | 3/2002 |
| CN | 1507708 | 6/2004 |
| CN | 1545252 A | 11/2004 |
| CN | 1604685 | 4/2005 |
| CN | 1 684457 A | 10/2005 |
| DE | 10162564 | 7/2003 |
| EP | 1037419 A2 | 9/2000 |
| EP | 1037491 | 9/2000 |
| EP | 1 054 518 | 11/2000 |
| EP | 1089500 A2 | 4/2001 |
| EP | 1179962 A2 | 2/2002 |
| EP | 1180881 | 2/2002 |
| EP | 1180907 | 2/2002 |
| EP | 1221273 A1 | 7/2002 |
| EP | 1233637 A1 | 8/2002 |
| EP | 1377100 A2 | 1/2004 |
| EP | 1493284 A1 | 1/2005 |
| EP | 1511245 | 3/2005 |
| EP | 1564953 A2 | 8/2005 |
| EP | 1571762 A1 | 9/2005 |
| EP | 1 594 260 | 11/2005 |
| EP | 1758276 A1 | 2/2007 |
| EP | 1841259 | 10/2007 |
| GB | 2340693 A | 2/2000 |
| JP | 8008806 | 1/1996 |
| JP | 8503591 | 4/1996 |
| JP | 9275582 A | 10/1997 |
| JP | 09307939 | 11/1997 |
| JP | 10022975 A | 1/1998 |
| JP | 10173585 | 6/1998 |
| JP | 11122167 A | 4/1999 |
| JP | 2000049689 A | 2/2000 |
| JP | 2001007761 | 1/2001 |
| JP | 2001016152 | 1/2001 |
| JP | 2001510974 | 8/2001 |
| JP | 2001512921 T | 8/2001 |
| JP | 2001251680 A | 9/2001 |
| JP | 2001523901 T | 11/2001 |
| JP | 2001525135 T | 12/2001 |
| JP | 2002077992 | 3/2002 |
| JP | 2002111627 A | 4/2002 |
| JP | 2002262330 A | 9/2002 |
| JP | 2003018641 A | 1/2003 |
| JP | 2003500911 | 1/2003 |
| JP | 2003509983 A | 3/2003 |
| JP | 2003510887 | 3/2003 |
| JP | 2003520153 A | 7/2003 |
| JP | 2003244161 | 8/2003 |
| JP | 2004153585 | 5/2004 |
| JP | 2004297284 A | 10/2004 |
| JP | 2004533731 | 11/2004 |
| JP | 2004350052 | 12/2004 |
| JP | 2005073276 A | 3/2005 |
| JP | 2005130482 A | 5/2005 |
| JP | 2005136773 A | 5/2005 |
| JP | 2005142965 A | 6/2005 |
| JP | 2005525730 A | 8/2005 |
| JP | 2005526417 A | 9/2005 |
| JP | 2005333671 | 12/2005 |
| JP | 2006514735 A | 5/2006 |
| JP | 2006518578 A | 8/2006 |
| JP | 06268574 A | 10/2006 |
| JP | 2006524966 T | 11/2006 |
| JP | 2006526323 A | 11/2006 |
| JP | 2007503156 A | 2/2007 |
| JP | 2007509531 | 4/2007 |
| JP | 2007514364 A | 5/2007 |
| JP | 2007514378 T | 5/2007 |
| JP | 2007521685 A | 8/2007 |
| JP | 2007522692 | 8/2007 |
| JP | 2007525044 | 8/2007 |
| JP | 2007525045 T | 8/2007 |
| JP | 2011045054 | 3/2011 |
| KR | 1019990084525 | 12/1999 |
| KR | 20010014223 | 2/2001 |
| KR | 20040018526 | 3/2004 |
| KR | 20040053859 A | 6/2004 |
| KR | 20040084599 A | 10/2004 |
| KR | 20040110044 A | 12/2004 |
| KR | 20050021083 | 3/2005 |
| KR | 20050023187 A | 3/2005 |
| KR | 20050039376 A | 4/2005 |
| KR | 1020050099633 | 10/2005 |
| KR | 1020050121274 | 12/2005 |
| KR | 20060012282 A | 2/2006 |
| RU | 2149518 C1 | 5/2000 |
| RU | 2181529 | 4/2002 |
| RU | 2188506 C2 | 8/2002 |
| RU | 2202154 C2 | 4/2003 |
| TW | 200423642 | 11/2004 |
| TW | 200539627 | 12/2005 |
| WO | 9408432 | 4/1994 |
| WO | WO9623371 | 8/1996 |
| WO | WO9845967 A2 | 10/1998 |
| WO | WO9856120 A2 | 12/1998 |
| WO | 9907090 A1 | 2/1999 |
| WO | 9909779 A1 | 2/1999 |
| WO | WO9913600 A1 | 3/1999 |
| WO | WO9959254 A2 | 11/1999 |
| WO | WO-0001188 A1 | 1/2000 |
| WO | WO0101610 A1 | 1/2001 |
| WO | 0122759 A1 | 3/2001 |
| WO | WO0135548 A1 | 5/2001 |
| WO | 0142047 A2 | 6/2001 |
| WO | WO0182504 | 11/2001 |
| WO | 0199291 A2 | 12/2001 |
| WO | WO0232183 A1 | 4/2002 |
| WO | WO0233841 A1 | 4/2002 |
| WO | WO0239760 A2 | 5/2002 |
| WO | WO0249305 | 6/2002 |
| WO | WO02073831 A1 | 9/2002 |
| WO | WO02101941 | 12/2002 |
| WO | WO02104058 A1 | 12/2002 |
| WO | WO03094544 A1 | 11/2003 |
| WO | WO03105498 A1 | 12/2003 |
| WO | 2004031918 A2 | 4/2004 |
| WO | 2004077685 | 9/2004 |
| WO | 2004077728 A2 | 9/2004 |
| WO | 2004084503 | 9/2004 |
| WO | 2008084503 | 9/2004 |
| WO | WO2004084452 | 9/2004 |
| WO | WO-2004084575 A2 | 9/2004 |
| WO | 2004100450 | 11/2004 |
| WO | WO-2004098072 A2 | 11/2004 |
| WO | 2004110081 | 12/2004 |
| WO | WO2004105420 A1 | 12/2004 |
| WO | 2005018115 A1 | 2/2005 |
| WO | 2005020490 | 3/2005 |
| WO | WO2005034438 | 4/2005 |
| WO | 2005050132 | 6/2005 |
| WO | 2005060132 | 6/2005 |
| WO | WO2005057812 A1 | 6/2005 |
| WO | WO2005060271 A1 | 6/2005 |
| WO | WO2005060277 A2 | 6/2005 |
| WO | 05065056 | 7/2005 |
| WO | 2005065056 | 7/2005 |
| WO | WO2005065056 A2 | 7/2005 |
| WO | WO2005069519 | 7/2005 |
| WO | 2005107311 A1 | 11/2005 |
| WO | WO2005125049 | 12/2005 |
| WO | WO2006044718 A2 | 4/2006 |
| WO | 2006075293 | 7/2006 |
| WO | 2007031956 | 3/2007 |

OTHER PUBLICATIONS

Majmundar, "Impact of Mobile-Originated Short Message Service on the Digital Control Channel of TDMA Systems," Vehicular Technology Conference, 2000. IEEE VTS Fall VTC 2000. 52nd

(56) References Cited

OTHER PUBLICATIONS

Sep. 24-28, 2000, Piscataway, NJ, USA, IEEE, Sep. 24, 2000, pp. 1550-1555.
Written Opinion—PCT/US06/048653, International Search Authority—European Patent Office, Mar. 27, 2008.
Gunnarson, F., et al.: "Uplink Admission Control in WCDMA Based on Relative Load Estimates", IEEE International Conference on Communications, vol. 1, pp. 3091-3095, IEEE, New York, NY USA (Apr. 28, 2002).
Wada, "Study of an OFDM Cellular System Using a Single Band," 2002 Communication Society Convention, Collection of Lecture Papers 1, Japan, IEEE, Aug. 20, 2002, p. 355 B-5-58.
Hang Zhang et al, "Clean up for Closed-Loop MIMO in H-ARQ MAP IE", IEEE P802.16e/D7 Broadband Wireless Access Working Group <http://ieee802.org/16>, pp. 1-6, Mar. 10, 2010.
IEEE P802.16e/D5: "Draft IEEE Standard for Local and metropolitan area networks, Part 16: Air Interface for Fixed and Mobile Broadband Wireless Access Systems Amendment for Physical and Medium Access Control Layers for Combined Fixed and Mobile Operation in Licensed Bands", pp. 1-356, Sep. 2004.
IEEE P802.16e/D5: "Draft IEEE Standard for Local and metropolitan area networks, Part 16: Air Interface for Fixed and Mobile Broadband Wireless Access Systems Amendment for Physical and Medium Access Control Layers for Combined Fixed and Mobile Operation in Licensed Bands", pp. 184-190, Sep. 2004.
Supplementary European Search Report—EP04713438, Search Authority—The Hague Patent Office, Nov. 30, 2010.
Translation of Office Action in Chinese application 200680047991.2 corresponding to U.S. Appl. No. 11/608,785, citing CN1604685 dated Dec. 31, 2010.
Translation of Office Action in Japanese application 2008-535789 corresponding to U.S. Appl. No. 11/549,611, citing JP2003244161, JP200277992 and JP200106152 dated Jan. 18, 2011.
Translation of Office Action in Ukraine application 200508984 corresponding to U.S. Appl. No. 11/748,433, citing US20020160802, WO0232183, RU2181529, WO9845967, EP1377100, US5867478, US20010007552, US6035000 and US5933421 dated Dec. 9, 2010.
Translation of Office Action in Ukraine Application 201010406 corresponding to U.S. Appl. No. 11/748,433, citing US5867478, US20010007552, US6035000, US5933421, WO02073831, WO02032183, RU2181529 and EP1377100 dated Feb. 22, 2011.
3GPP: ETSI TS 125 331 V6.3.0: Radio Resource Control (RRC) protocol specification (3GPP TS 25.331 version 6.3.0 Release 6), ETSI TS 125 331, Sep. 1, 2004, pp. 49, 202-209, 220,221,406,579-585, 589, 930.
Ericsson: Discussion on SIR Measurement, TSG-RAN Working Group 4 (Radio) meeting #18, Berlin, Germany, 3GPP TS 25.101 V3.7.0, Jul. 9, 2001, R4-010895, URL: http://www.3gpp.org/ftp/tsg_ran/WG4_Radio/TSGR4_18/Docs/R4-010895.zip.
European Search Report—EP11165270, Search Authority—Berlin Patent Office, Jun. 6, 2011.

Qualcomm, Scheduling Information Contents, #3GPP TSG-RAW WG2 meeting #48,3GPP, Aug. 29, 2005, R2-051957, URL: http://3gpp.org/ftp/tsg_ran/WG2_RL2/TSGR2_48/Docments/R2-095517.zip.
Sumsung, EDCH Buffer Status Reporting. 3GPP TSG RAN2#45bis, 3GPP, Jan. 10, 2005, R2-050026, URL: http://www.3gpp.org/ftp/tsg_ran/WG2_RL2/TSGR2_45bis/Dcs/R2-050026.zip.
Sumsung, Uplink control signaling structure (Revision of R1-041086), 3GPP TSG-RAN WG1 Meeting #38bis, 3GPP, Sep. 20, 2004, R1-041222, URL: http://www.3gpp.org/ftp/tsg_ran/WG1_RL1/TSGR1_38bis/Dcs/R1-041222.zip.
Tim/Tilab, Blu, Mobilkom Austria, One2one,Telefonica: Re-introduction of SIR measurement, 3GPP TSG-RAN4 Meeting #17,3GPP, May 21, 2001, R4-010647, URL: http://www.3gpp.org/ftp/tsg_ran/WG4_Radio/TSGR4_17/Docs/R4-010647.Zip.
Chang, Cheng-Ta: "Downlink Transmit Power Issues in a WCDMA Cellular System,"Dec. 14, 2004, p. 3, Fig. 1, Retrieved online: http://wintech.ee.nctu.edu.tw/handoff/MediaTek/Material/Wintech/1214/Downlink%20Transmit%20Power%20Issues%20in%20a%20WCDMA%20Cellular%20System.pdf.
Gunnarsson, G. et al.,"Location Trial System for Mobile Phones," Global Telecommunications Conference, 1998. Globecom 98. The Bridge to Global Integration. IEEE, vol. 4, pp. 2211-2216, Nov. 8-12, 1998.
Hobfeld, T. et al., "Supporting Vertical Handover by Using a Pastry Peer-to-Peer Overlay Network," Fourth Annual IEEE International Conference on Pervasive Computing and Communications Workshops, 2006. Percom Workshops 2006. Mar. 13-17, 2006, pp. 163-167, p. 164, paragraph III, IEEE, Piscataway, NJ, USA, XP010910514, ISBN: 0-7695-2520-2.
LG Electronics Inc., "Relative Buffer Status Reporting," 3GPP TSG-RAN WG2 meeting #46bis, R2-050852, Apr. 4, 2005, pp. 1-3, URL, http://www.3gpp.org/ftp/tsg_ran/WG2_RL2/TSGR2_46bis/Documents/R2-050852.zip.
Taiwan Search Report—TW095148259—TIPO—Nov. 6, 2012.
Hosein, et al., "Optimal Assignment of Mobile Station Serving Sector for the Forward Link of a Time-Shared Wireless Packet Data Channel," Fifth IEE International Conference on 3G Mobile Communication Technologies (3G 2004), Oct. 18-Oct. 20, 2004, pp. 654-658.
Kwon, at al., "Quasi-Dedicated Access Scheme for Uplink Realtime Services in Future Wireless Communication Systems," Vehicular Technology Conference, 2005. VTC 2005—Spring. 2005 IEEE 61st Stockholm. Sweden. Apr. 20-May 1, 2005, Piscataway, NJ, USA; May 30, 2005. pp. 3117-5121.
Majmundar, "Impact of Mobile-Orignated Short Message Service on the Digital Control Channel of TDMA Systems." Vehicular Technology Conference, 2000. IEEE VTS Fall VTC 2000, 52nd Sep. 24-28, 2000, Piscataway, NJ, USA, IEEE, Sep. 24, 2000, pp. 1550-1555.
International Search Report—PCT/US06/048653, International Search Authority—European Patent Office, Mar. 27, 2008.

\* cited by examiner

METHODS AND APPARATUS RELATED TO SELECTING A REQUEST GROUP FOR A REQUEST REPORT

RELATED APPLICATIONS

The present application for patent is a Continuation-in-Part of patent application Ser. No. 11/333,792, filed on Jan. 17, 2006, titled "METHODS AND APPARATUS OF IMPLEMENTING AND/OR USING A DEDICATED CONTROL CHANNEL", pending, which claims priority to Provisional Application No. 60/752,973, filed on Dec. 22, 2005, titled "COMMUNICATIONS METHODS AND APPARATUS", and assigned to the assignee hereof and each of which is hereby expressly incorporated by reference.

FIELD OF THE INVENTION

The present invention relates to wireless communications methods and apparatus and, more particularly, to methods and apparatus related to selecting a request group from among a plurality of possible request groups which can be reported in a request report, for example, in an uplink traffic channel request report.

BACKGROUND

In multiple access wireless communications systems, multiple wireless terminals are typically in competition for limited air link resources. A wireless terminal, operating in a state supporting uplink traffic signaling, typically needs to communicate control information to a base station attachment point. The information may be communicated in the form of one or more control information reports which allow the base station attachment point to characterize the wireless terminal and allocate resources such as uplink transmission resources.

A wireless terminal may support uplink traffic corresponding to a plurality of different types of applications. At different times the wireless terminal may have different traffic channel reporting needs. Accordingly, there is a need for methods and apparatus which would allow for a variety of reporting alternatives. For example, in systems which used a fixed bit size request report format, it would be beneficial if reporting alternatives corresponding to different groupings of traffic could be supported without changing the number of bits used for a report. In addition, assuming methods and apparatus for supporting reporting alternatives were developed, it would also be beneficial if methods and/or apparatus which could be used to select between available reporting alternatives could also be developed and/or supported. Improvements in reporting, and/or selection between reporting alternatives, if available, could facilitate efficient air link resource allocation and/or help to satisfy a wireless terminal's changing traffic needs and/or quality of service requirements.

SUMMARY

Various embodiments are directed to methods and apparatus for supporting a plurality of reporting alternatives, e.g., for a fixed size report. Some features are related to selecting a request group associated with a reporting alternative for a control information request report, e.g., an uplink traffic report which provides information on the amount of data waiting at a communications device to be transmitted. Such a report may be viewed and/or interpreted as a request for uplink transmission resources and is therefore sometimes referred to as an uplink request report.

Various embodiments are directed to reporting transmission backlog information. In some such embodiments, a wireless communications device maintains and updates transmission backlog information corresponding to a plurality of different transmission request groups. Different request groups may correspond to different uplink traffic queues. For a request reporting opportunity, the communications device selects a request group from among the plurality of different transmission request groups as a function of: request group changes in backlog with respect to previously reported requests, the changes taking into consideration base station knowledge, e.g., base station allocation of transmission resources; and request group priority information. A request report is generated conveying backlog information corresponding to the selected request group and, the generated report transmitted over a wireless communications link.

An exemplary method of reporting transmission backlog information in accordance with various embodiments comprises: maintaining backlog information corresponding to a plurality of different transmission request groups; and selecting a request group from the plurality of different transmission request groups for which backlog information is maintained, wherein said selecting is performed as a function of a request group change in backlog with respect to previously reported backlog information after taking into consideration changes in backlog due to base station allocation of transmission resources.

Various embodiments are also directed to wireless communication devices, e.g., wireless terminals such as mobile nodes. One exemplary wireless communications device is intended for use in a wireless communications system and communicates transmission backlog information to a base station using one of a plurality of supported reporting alternatives. The exemplary wireless communications device includes: a transmission backlog management module for maintaining backlog information corresponding to a plurality of different transmission request groups; and a selection module for selecting a request group from the plurality of different transmission request groups for which back log information is maintained, wherein said selecting is performed as a function of a request group change in backlog with respect to previously reported backlog information after taking into consideration changes in backlog due to base station allocation of transmission resources.

While various embodiments have been discussed in the summary above, it should be appreciated that not necessarily all embodiments include the same features and some of the features described above are not necessary but can be desirable in some embodiments. Numerous additional features, embodiments and benefits are discussed in the detailed description which follows.

DETAILED DESCRIPTION

Figure 1:
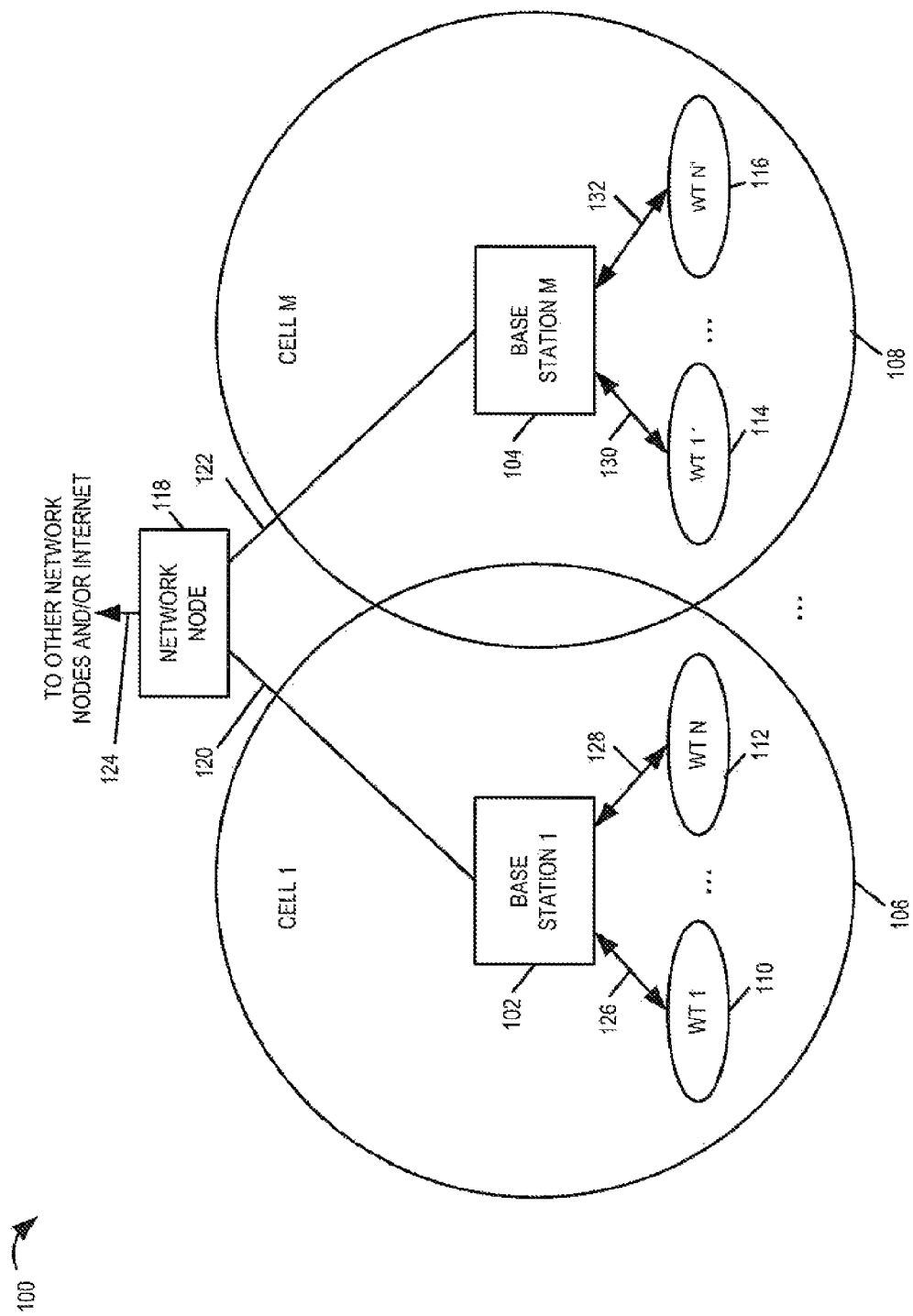
FIG. 1 is drawing of an exemplary wireless communications system implemented in accordance with various embodiments.

FIG. 1 is drawing of an exemplary wireless communications system 100 implemented in accordance with various embodiments. Exemplary wireless communications system 100 is, e.g., an orthogonal frequency division multiplexing (OFDM) multiple access wireless communications system using a dedicated control channel uplink reporting structure including at least some fixed size multi-bit request reports. The fixed bit size request reports can be used to report transmission backlog information, e.g., the number of frames of information waiting to be transmitted with regard to a queue or set of queues. A backlog report may provide information on one or more request groups where different request groups correspond to different queues or sets of queues which can be used to store information to be transmitted.

Exemplary wireless communications system 100 includes a plurality of base stations (base station 1 102, . . . , base station M 104). Each base station (102, 104) has a corresponding wireless coverage area (cell 1 106, cell M 108), respectively. System 100 also includes network node 118 which is coupled to base stations (102, 104) via network links (120, 122), respectively. Network node 118 is also coupled to other network nodes and/or the Internet via link 124. Network links (120, 122, 124) are, e.g., fiber optic links. System 100 may also include cells with multiple sectors and/or cells using multiple carriers.

System 100 also includes a plurality of wireless terminals. At least some of the wireless terminals are mobile nodes which may move throughout the communication system. In FIG. 1, wireless terminals (WT 1 110, WT N 112) are located in cell 1 106 and coupled to base station 1 102 via wireless links (126, 128), respectively. In FIG. 1, wireless terminals (WT 1' 114, WT N' 116) are located in cell M 108 and coupled to base station M 104 via wireless links (130, 132), respectively. In accordance with various embodiments, at least some of the wireless terminals use a request report format, e.g., for a fixed bit size uplink traffic channel request report, allowing the wireless terminal to select, for a request report to be transmitted, between reporting alternatives, said reporting alternatives corresponding to at least two different request groups. For example, an exemplary 4 bit uplink traffic channel request report format may include 16 distinct bit patterns, and a first subset of the 16 bit mapping patterns may be associated with mapping request group 1 frame count backlog information, while a second subset of the 16 bit mapping patterns may be associated with mapping request group 2 frame count backlog information, and a third subset of the 16 bit mapping patterns may be associated with mapping request group 3 frame count backlog information said first and second and third subsets being non-overlapping. Continuing with the example, the wireless terminal selects, for a given reporting opportunity, one of the request groups on which to report backlog information. In some embodiments, the selection is performed as a function of: changes in backlog in request groups, whether there is information in a request group, the priority levels associated with the request groups, previous request reports, and/or base station previous allocation.

Figure 2:
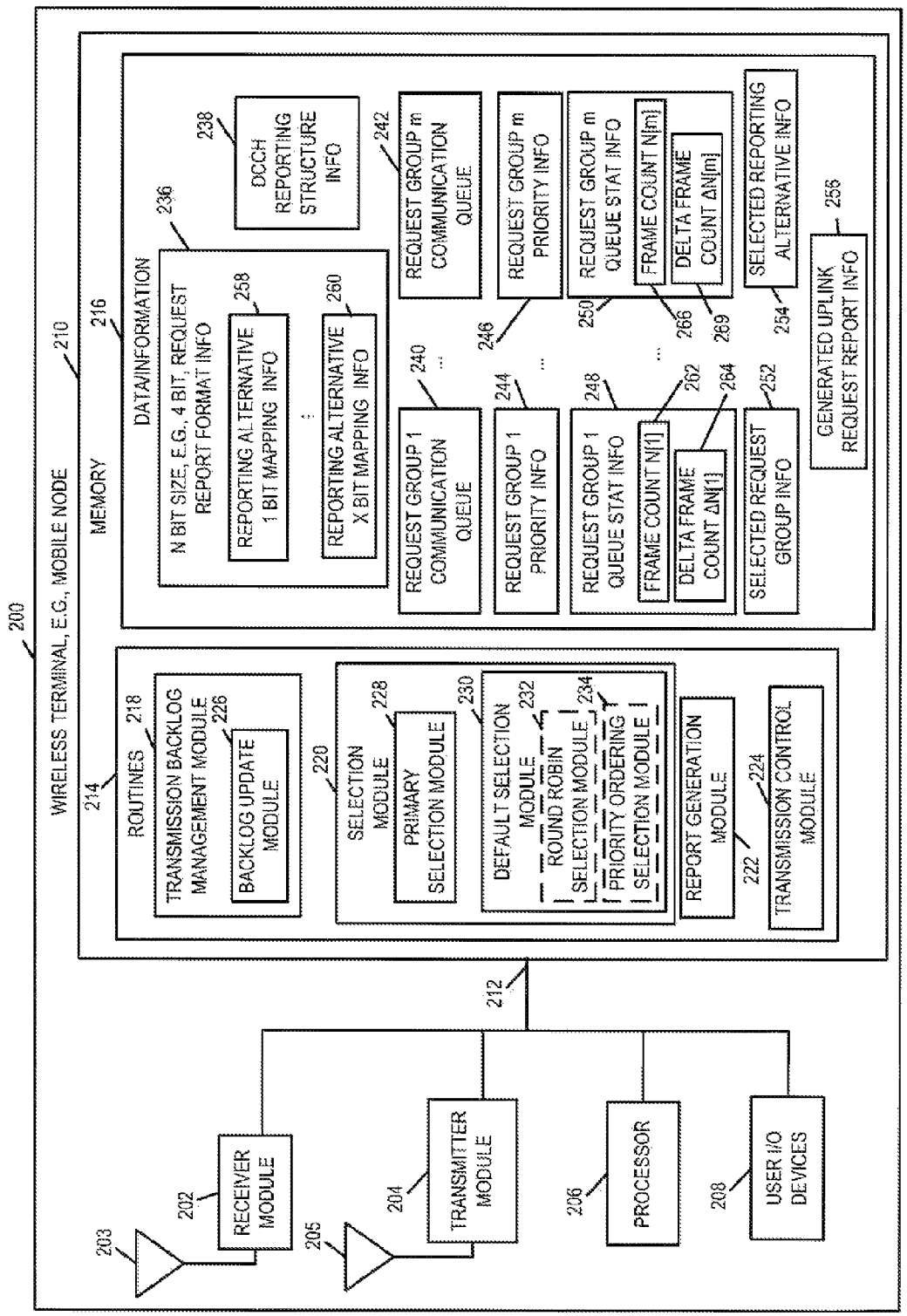
FIG. 2 is a drawing of an exemplary wireless terminal, e.g., mobile node, in accordance with various embodiments.

FIG. 2 is a drawing of an exemplary wireless terminal 200, e.g., mobile node, in accordance with various embodiments. Exemplary wireless terminal 200 is, e.g., a handheld mobile communications device. Exemplary wireless terminal 200 may be any of the wireless terminals 110, 112, 114, 116 of system 100 of FIG. 1.

Exemplary wireless terminal 200 includes a receiver module 202, a transmitter module 204, a processor 206, user I/O devices 208, and a memory 210 coupled together via a bus 212 over which the various elements may interchange data and information. Memory 214 includes routines 214 and data/information 216. The processor 206, e.g., a CPU, executes the routines 214 and the data/information 216 in memory 210 to control the operation of the wireless terminal 200 and implement methods.

Receiver module 202, e.g., an OFDM receiver, is coupled to receive antenna 203 via which the wireless terminal receives downlink signals from base stations. The received downlink signals include assignment signals conveying assignments for uplink traffic channel segments.

Transmitter module 204, e.g., an OFDM transmitter, is coupled to transmit antenna 205 via which the wireless terminal transmits uplink signals base stations. The uplink signals include dedicated control channel segment signals and traffic channel segment signals. At least some of the dedicated control channel segment signals convey uplink request reports for traffic channel air link resources, e.g., 1 bit uplink traffic channel request report, 3 bit uplink traffic channel request reports and 4 bit uplink traffic channel request reports. In some embodiments, the same antenna is used for receiver and transmitter.

User I/O devices 208, e.g., microphone, keypad, keyboard, switches, camera, speaker, display, etc., allow a user of wireless terminal 200 to input data/information and access output data/information. User I/O devices 208 also allow a user of wireless terminal 200 to control at least some functions of wireless terminal 200, e.g., initiate or terminate a communications session and/or application.

Routines 214 include a transmission backlog management module 218, a selection module 220, a report generation module 222, and a transmission control module 224. Transmission backlog management module 218 includes a backlog update module 226. Selection module 220 includes a primary selection module 228 and a default selection module 230. Default selection module 230 includes one or more of alternative default selection modules (round robin selection module 232, priority ordering selection module 234).

Transmission backlog management module 218 maintains backlog information corresponding to a plurality of different transmission request groups. Backlog update module 226 updates the maintained backlog information as a function of at least one of received information to be transmitted, dropped information, and transmitted information.

Selection module 220 selects a request group from the plurality of different transmission request groups for which backlog information is maintained, wherein said selecting is performed as a function of a request group change in backlog with respect to previously reported backlog information after taking into consideration changes in backlog due to base station allocation of transmission resources. For example, for each of a plurality of request opportunities for a certain type of n bit uplink traffic channel request report, e.g., a 4 bit uplink traffic channel request report, selection module 220 performs a selection identifying a request group on which backlog information is to be conveyed for that reporting opportunity.

In some embodiments, primary selection module 228, selects, when at least one of the transmission request groups has a non-zero change in backlog with respect to the last previously reported request report conveying that particular request group's backlog information after taking into consideration changes in backlog due to base station allocation of transmission resources, the request group having the highest priority from among the request groups having a non-zero change in backlog with respect to the last previously reported request report conveying that particular request groups backlog information after taking into consideration changes in backlog due to base station allocation of transmission resources.

In some embodiments, primary selection module 228, selects, when at least one of the transmission request groups has a positive change in backlog with respect to the last previously reported request report conveying that particular request group's backlog information after taking into consideration changes in backlog due to base station allocation of transmission resources, the request group having the highest priority from among the request groups having a positive change in backlog with respect to the last previously reported request report conveying that particular request groups backlog information after taking into consideration changes in backlog due to base station allocation of transmission resources.

In some embodiments, primary selection module 228, selects, when at least one of the transmission request groups has a positive backlog and a non-negative change in backlog with respect to the last previously reported request report conveying that particular request group's backlog information after taking into consideration changes in backlog due to base station allocation of transmission resources, the request group having the highest priority from among the request groups having a positive backlog and a non-negative change in backlog with respect to the last previously reported request report conveying that particular request groups backlog information after taking into consideration changes in backlog due to base station allocation of transmission resources.

In some embodiments, default selection module 230 selects a request group from among the plurality of request groups when none of the individual request groups have a non-zero change in backlog with respect to the last previously reported request report conveying that particular individual request group's backlog information after taking into consideration changes in backlog due to base station allocation of transmission resources.

In some embodiments, default selection module 230 selects a request group from among the plurality of request groups when none of the individual request groups have a positive change in backlog with respect to the last previously reported request reports conveying that particular individual request group's backlog information after taking into consideration changes in backlog due to base station allocation of transmission resources.

In some embodiments, default selection module 230 selects a request group from among the plurality of request groups when none of the individual request groups have a positive backlog and a non-negative change in backlog with respect to the last previously reported request report conveying that particular individual request group's backlog information after taking into consideration changes in backlog due to base station allocation of transmission resources.

Figure 5A:
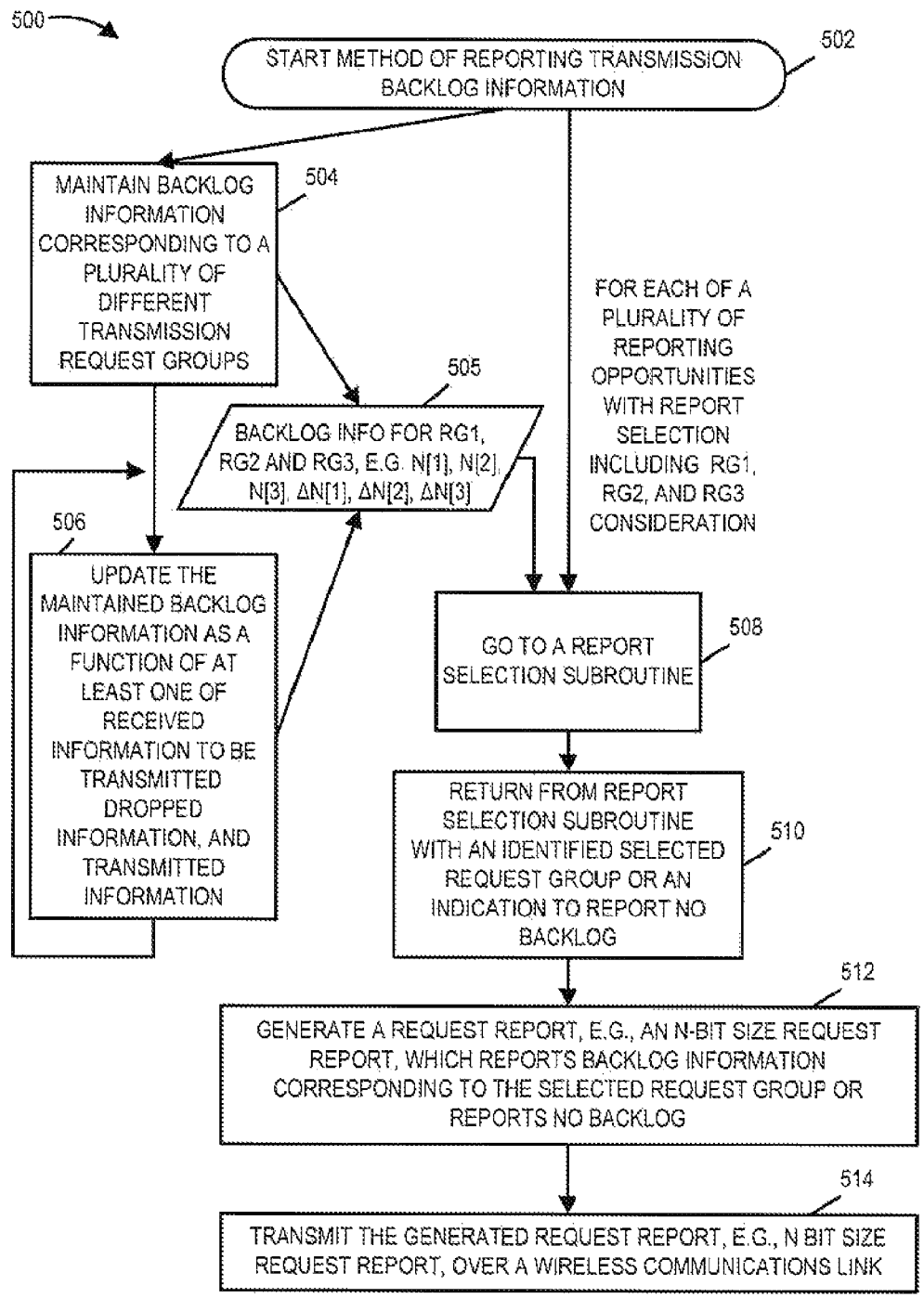
FIG. 5 comprising the combination of FIG. 5A, FIG. 5B, FIG. 5C, FIG. 5D, FIG. 5E
FIG. 5F is a drawing of a flowchart of an exemplary method of operating a wireless communications device to report transmission backlog information.
Figure 5B:
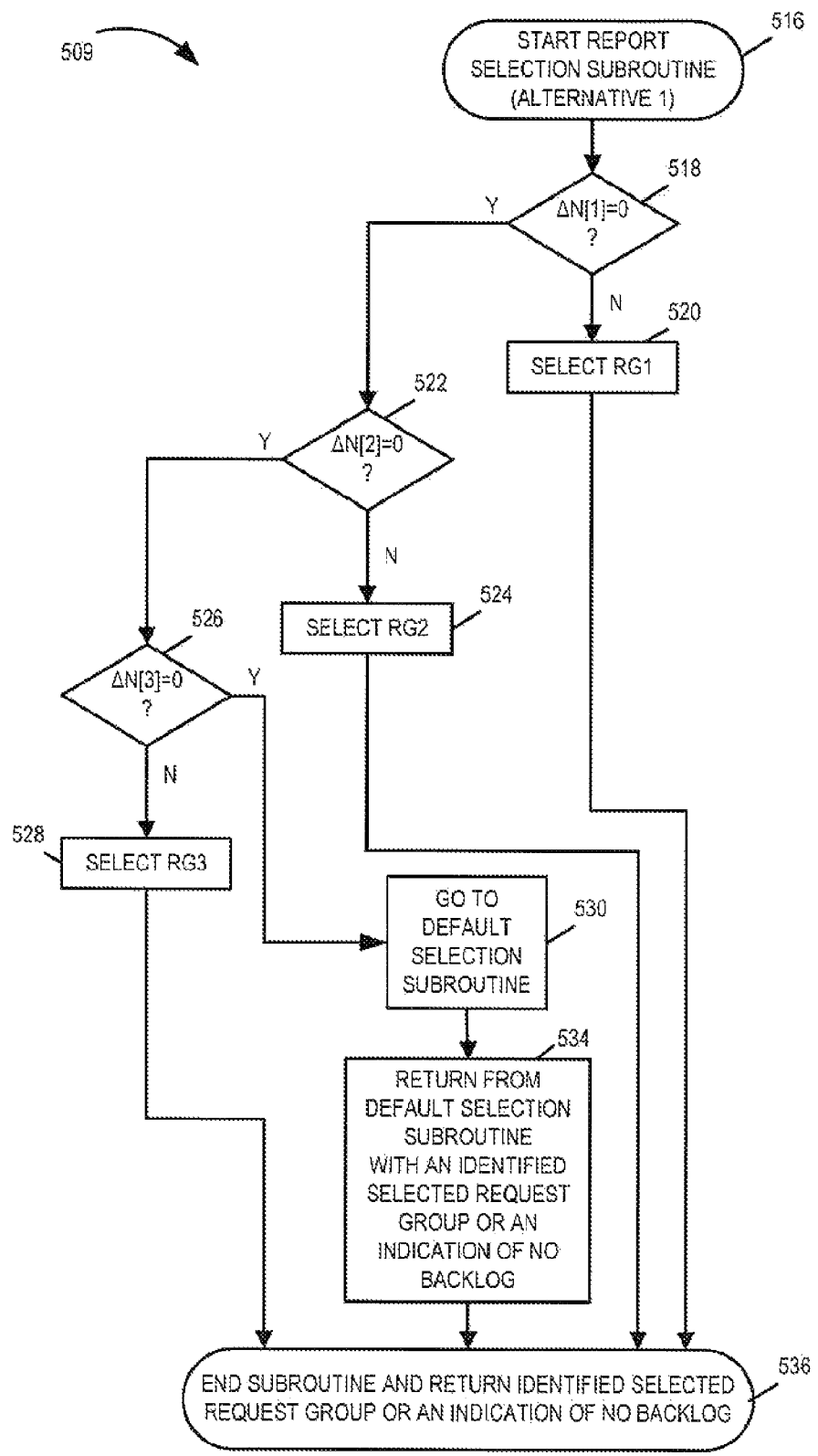
Figure 5C:
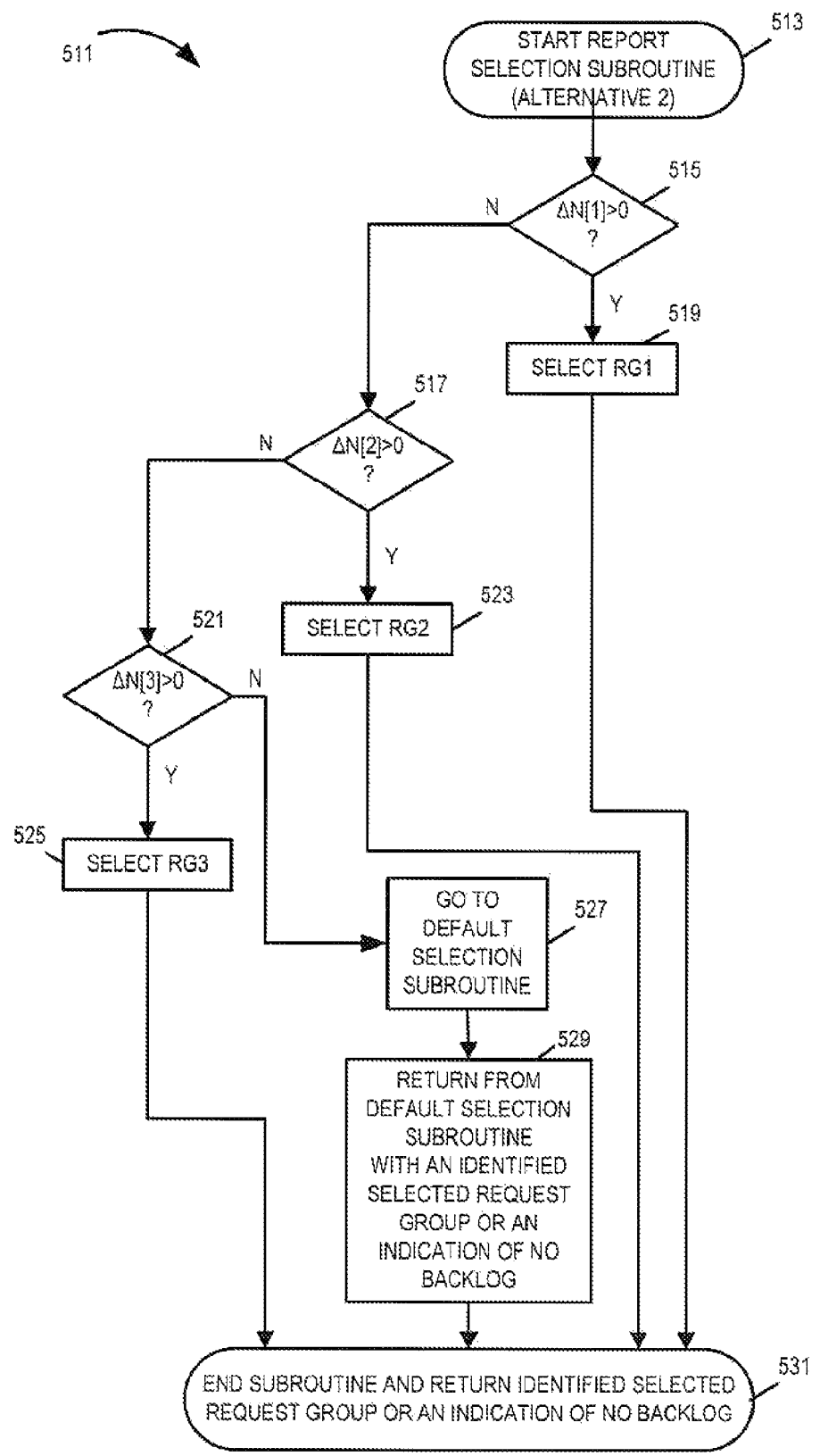
Figure 5D:
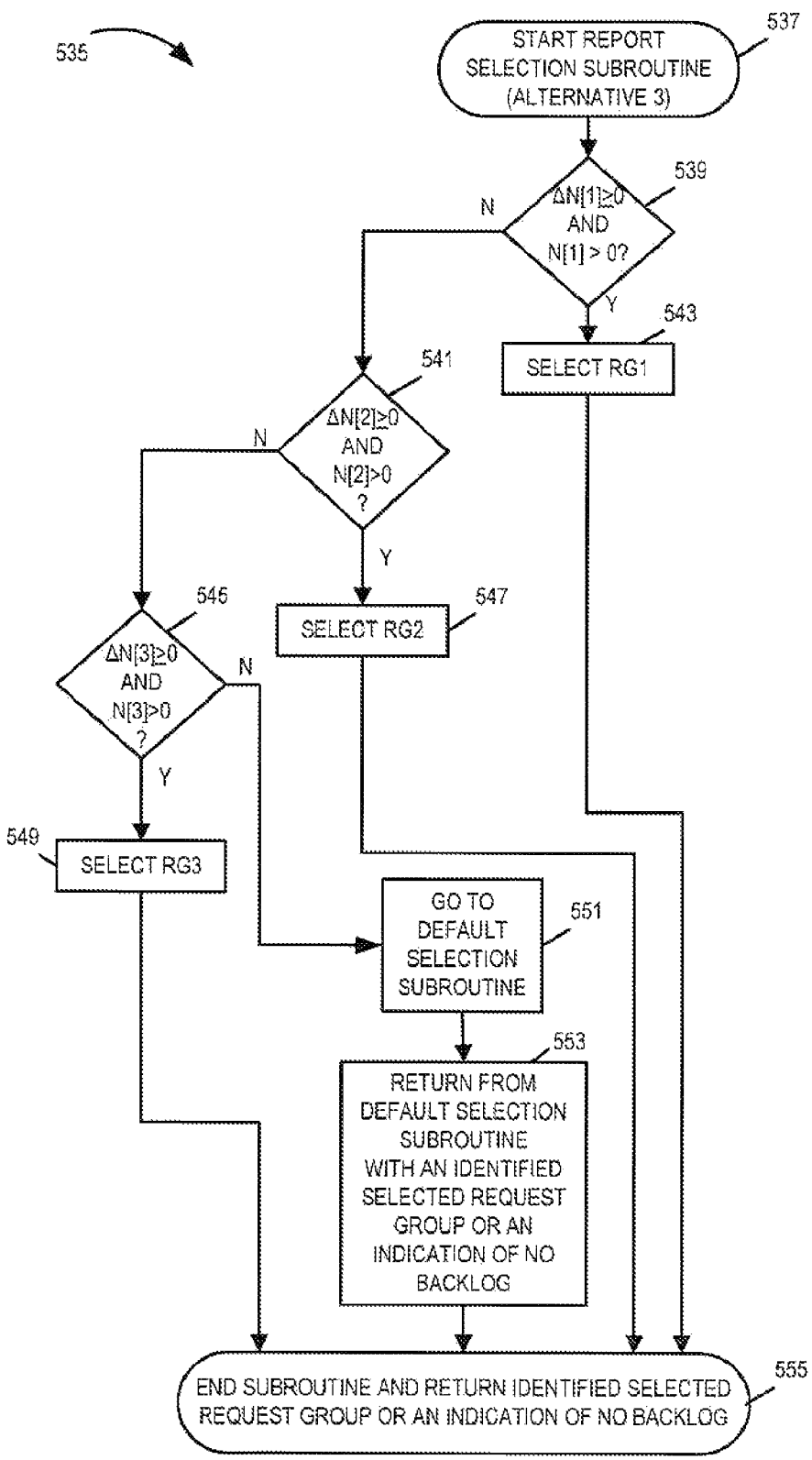
Figure 5E:
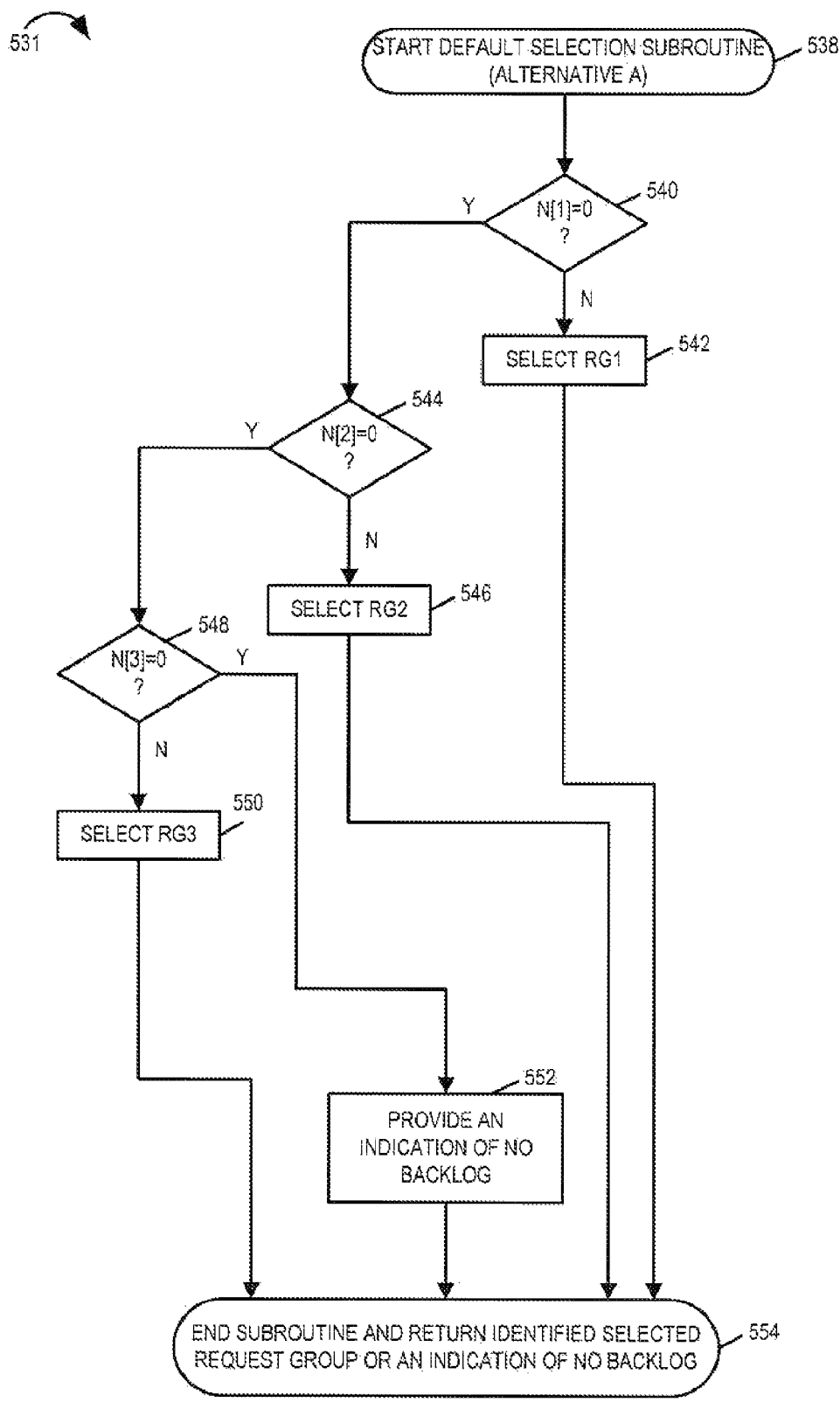

Round robin selection module 232 performs the selection for the default selection module 230 as a function of a round robin selection process. Flowchart 533 of FIG. 5E represents an example of a round robin selection process. Priority ordering selection module 234 performs the selection for the default selection module 230 as a function of a priority ordered selection process. Flowchart 531 of FIG. 5E represents an example of a priority ordered selection process.

In some embodiments, the default selection module 230, at times, determines that it should be reported that there is no backlog in any of the request groups.

Report generation module 222 generates an n-bit size request report in accordance with N bit size request report format information 236 and the reporting alternative indicated by information 254 corresponding to the selected request group indicated by information 252.

Transmitter module 204 transmits the generated n-bit size request report over a wireless communications link, e.g., to a base station serving as the wireless terminal's current point of network attachment. Transmission control module 224 controls the operation of transmitter module 204 to control the transmission of the generated n-bit size request report over a wireless communications link.

Data/information 216 includes N bit size, e.g., 4 bit size request report format information 236, dedicated control channel reporting structure information 238, a plurality of request group communication queues (request group 1 communication queue 240, . . . , request group m communication queue 242), a plurality of request group priority information (request group 1 priority information 244, . . . , request group m priority information 246), a plurality of request group queue statistics information (request group 1 queue stats information 248, . . . , request group m queue stats information 250), selected request group information 252, selected reporting alternative information 254, and generated uplink request report information 256. N bit size report format information 236 includes a plurality of sets of reporting alternative bit mapping information (reporting alternative 1 bit mapping information 258, . . . , reporting alternative X bit mapping information 260). Request group 1 queue statistics information 248 includes frame counts N[1] 262, and delta frame counts ΔN[1] 264. Request group m queue statistics information 250 includes frame counts N[m] 266, and delta frame counts ΔN[m] 269.

Figure 9:
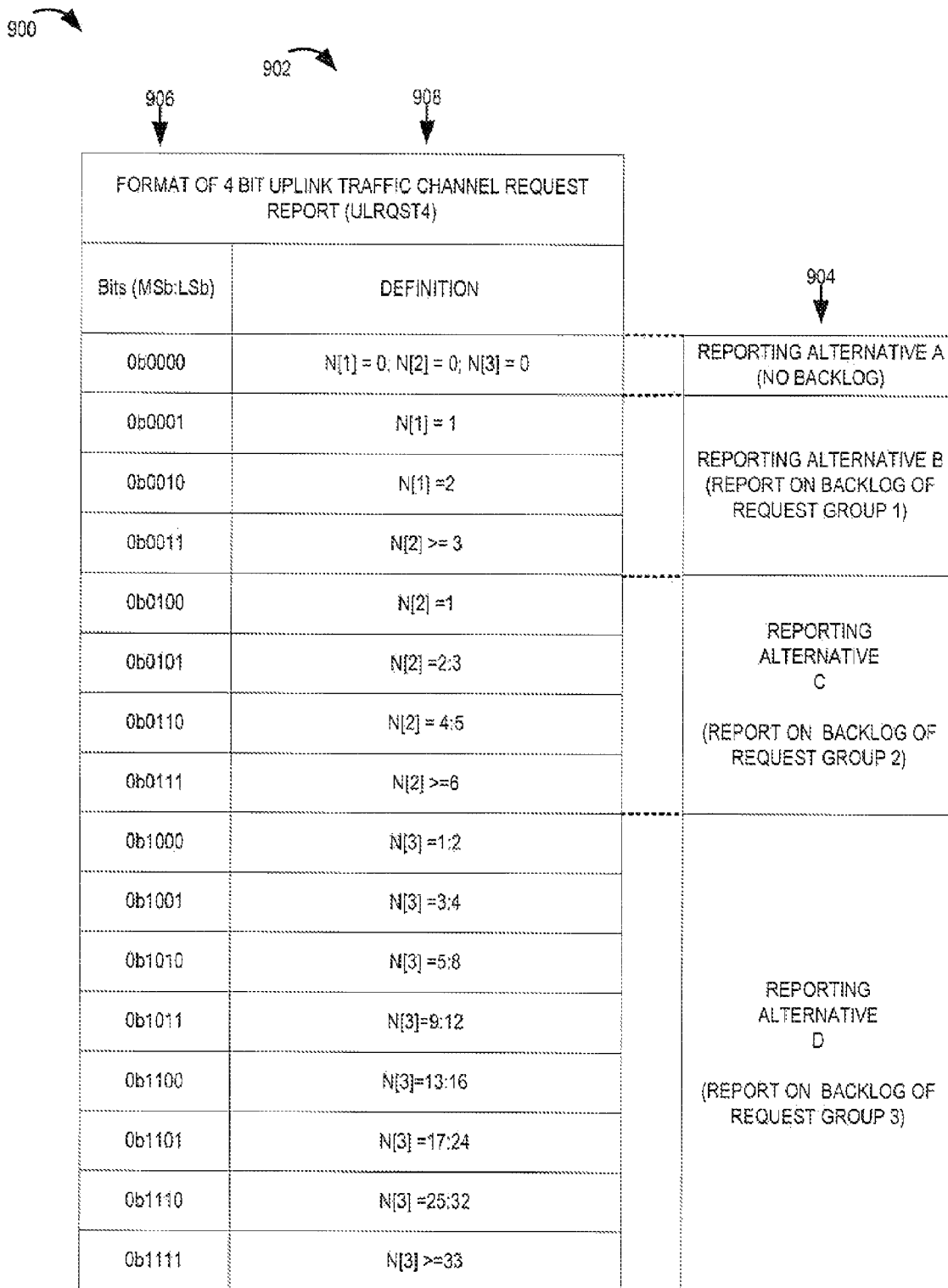
FIG. 9 is a drawing including a table describing an exemplary format of exemplary 4 bit uplink traffic request report (ULRQST4) and a column describing reporting alternatives.
Figure 10:
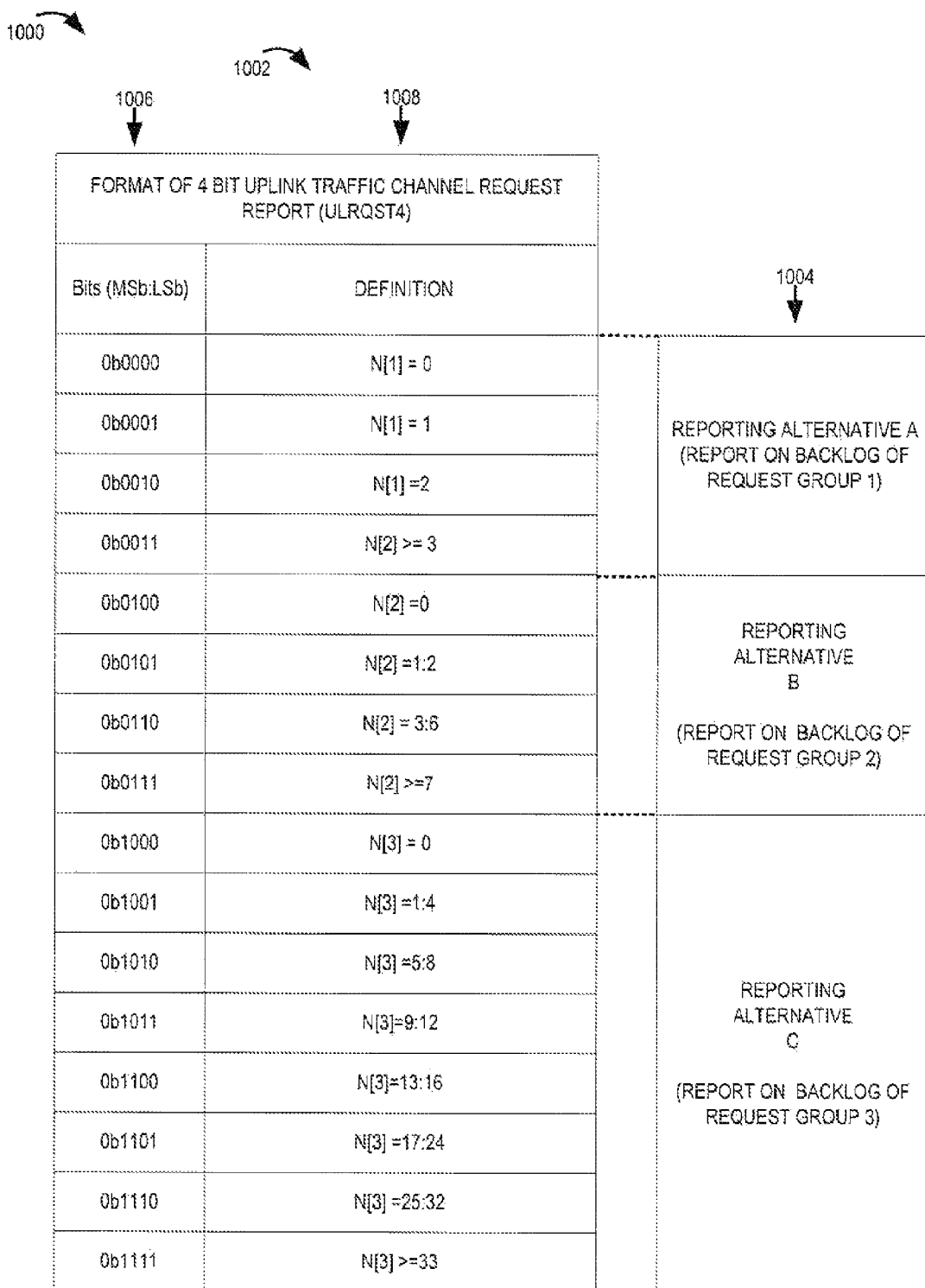
FIG. 10 is a drawing including a table describing another exemplary format of exemplary 4 bit uplink traffic request report (ULRQST4) and a column describing reporting alternatives.

FIG. 9 represents one example of exemplary N bit size request report format information 236 used in some embodiments. FIG. 10 represents another example of exemplary N bit size request report format information 236 used in some embodiments. In various embodiments, the n-bit size request report format information supports a plurality of reporting alternatives, different reporting alternatives corresponding to different request groups.

Figure 6:
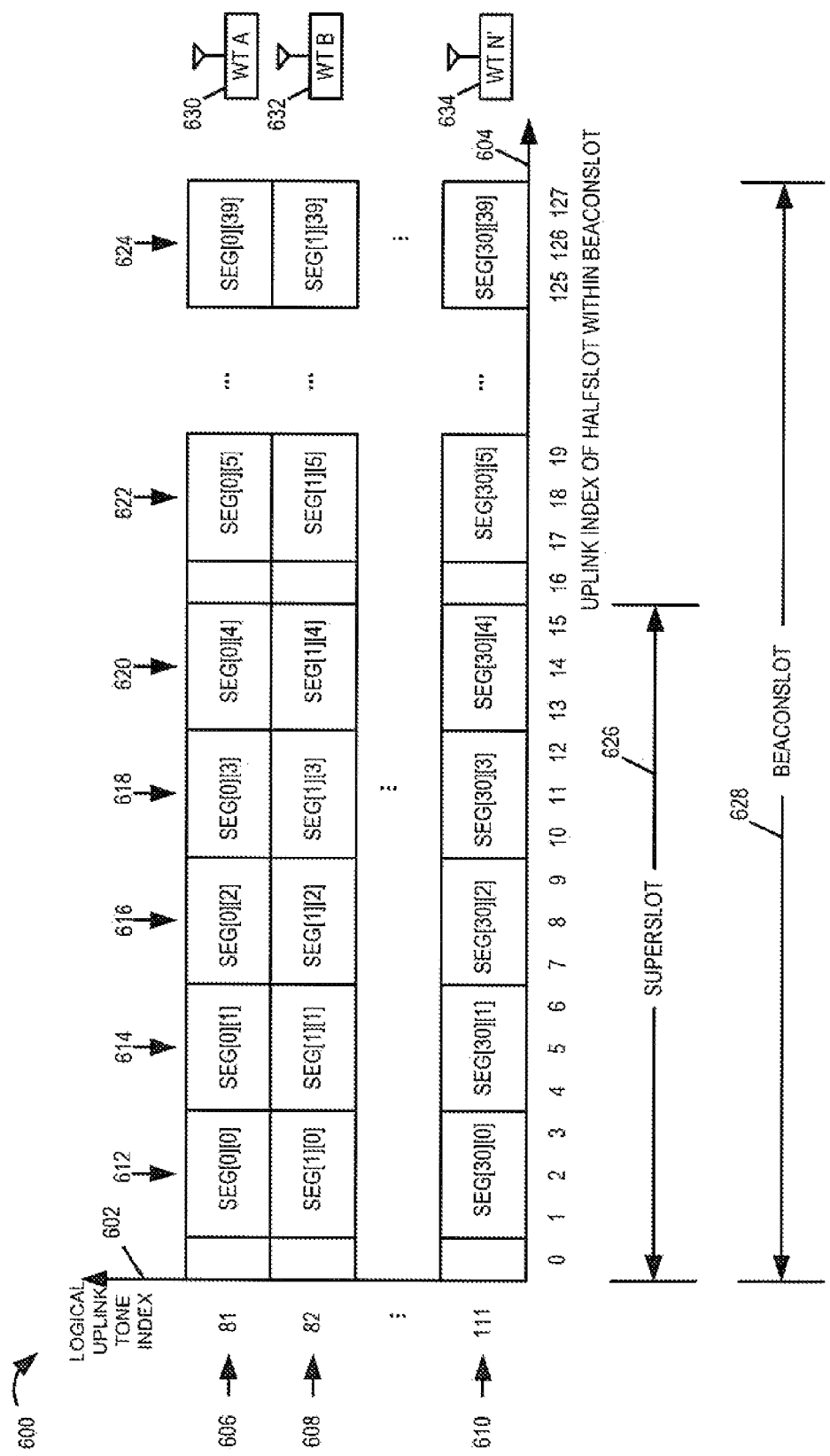
FIG. 6 is a drawing of exemplary uplink dedicated control channel (DCCH) segments in an exemplary uplink timing and frequency structure in an exemplary orthogonal frequency division multiplexing (OFDM) multiple access wireless communications system.
Figure 7:
FIG. 7 includes a table of a set of exemplary Dedicated Control Channel Reports (DCRs) used in an exemplary DCCH reporting structure.
Figure 8:
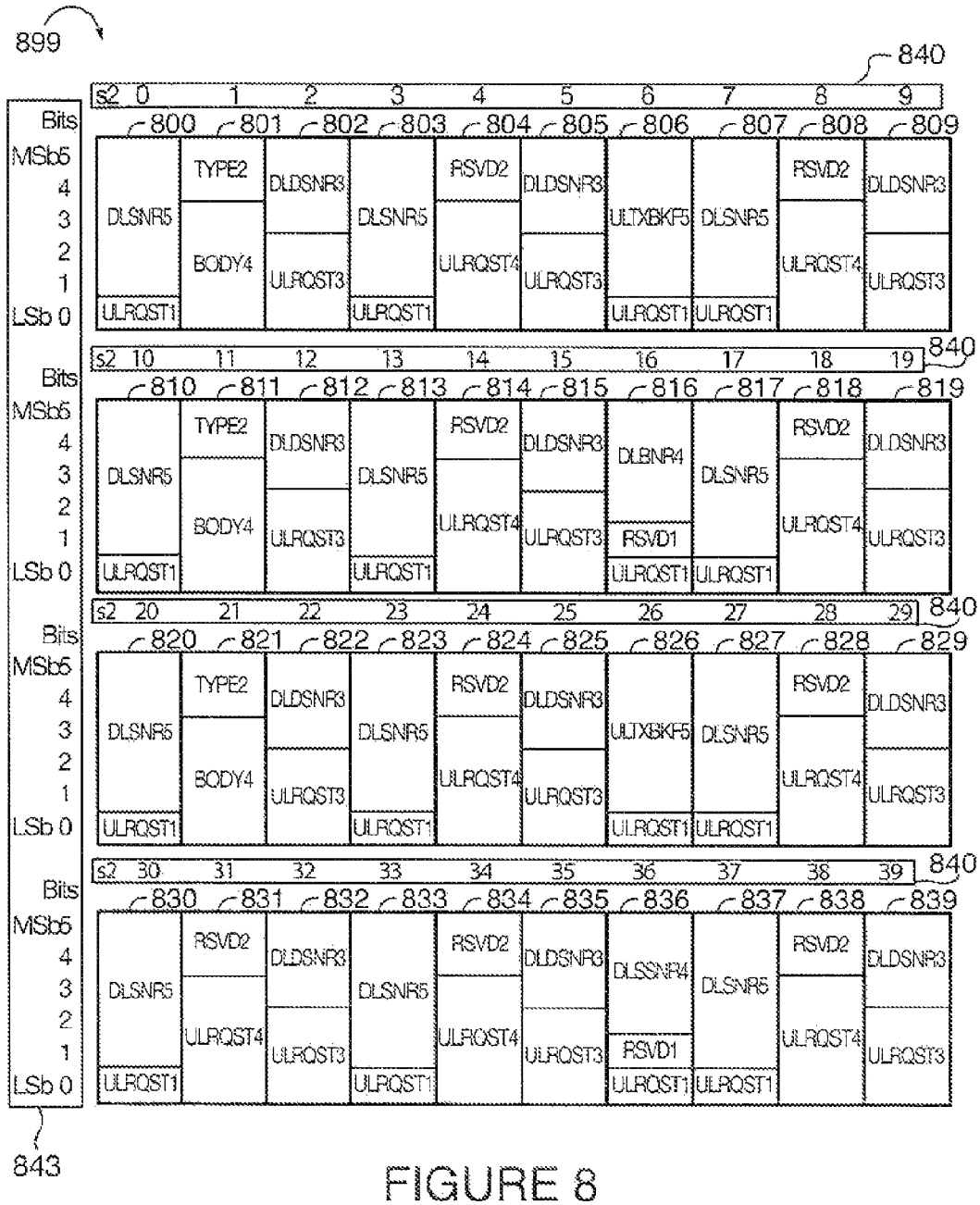
FIG. 8 is a drawing illustrating an exemplary dedicated control channel reporting format including the dedicated control channel reports of FIG. 9.

Dedicated control channel (DCCH) reporting structure information 238 includes information identifying DCCH logical channel tones, DCCH segments, mapping of different types of reports to segments, and associated timing in a recurring reporting structure. The different types of reports in the DCCH reporting structure include a request report type in accordance with the N bit size request report format information 236. FIGS. 6, 7, and 8 include some exemplary DCCH reporting structure information.

Request groups communication queues (request group 1 communication queue 240, . . . request group m communication queue 242) are a plurality of communication queues for storing data to be transmitted, where each request group corresponds to one communication queue. In some embodiments, at least some of the different request groups correspond to a set of communication queues. Request group priority information (request group 1 priority information 244, . . . , request group m priority information 246) are stored request group priority information associated with the different request groups. Selection of a reporting alternative is performed, in some embodiments, as a function of request group priority information. In various embodiments the request group priorities are predetermined. Request groups queue statistics information (request group 1 queue stats info 248, . . . , request group m queue stats info 250) includes frame counts of backlog, e.g., MAC frame counts of backlog, (N[1] 262, . . . , N[m] 266), respectively corresponding to (request group 1 communication queue 240, . . . , request group m communication queue 242), respectively. Request groups queue statistics information (request group 1 queue stats info 248, . . . , request group m queue stats info 250) includes delta frame counts of backlog, e.g., delta MAC frame counts of backlog, ($\Delta$N[1] 264, . . . , $\Delta$N[m] 269), respectively corresponding to (request group 1 communication queue 240, . . . , request group m communication queue 242), respectively. The delta frame count information for a request group, e.g., $\Delta$N[1] 264 for request group 1, is calculated with respect to the last previously transmitted backlog information with respect to that request group after taking into consideration changes due to base station knowledge, e.g., base station allocation of transmission resources. Selection module 220, uses the queue stats info (248, . . . , 250) in determining a selected request group.

Selected request group information 252, an output of module 220 and an input to module 222, is, e.g., an identifier identifying which of the m request groups has been selected by selection module 220. In some embodiments, selected request group information, at time, indicates that none of the request groups have backlog. Selected reporting alternative information 254, which corresponds to the selected request group information 252 identifies one of the X reporting alternatives in accordance with request report format information 236. Generated uplink request report information 256 is an output of report generation module 222. For example, if the uplink request report is a four bit uplink request report, the report is one of 16 different bit patterns.

Figure 3:
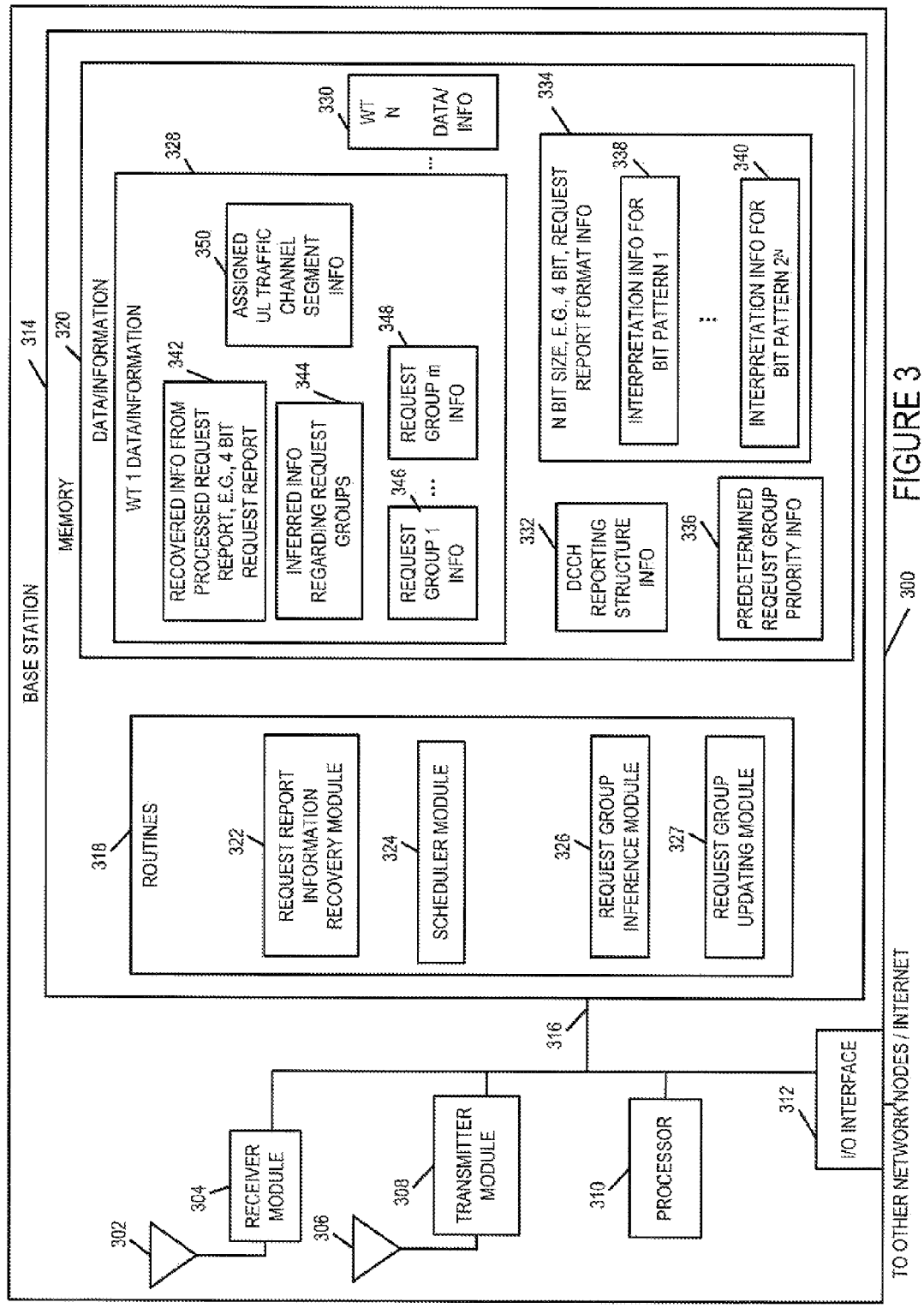
FIG. 3 is a drawing of an exemplary base station in accordance with various embodiments.
Figure 4A:
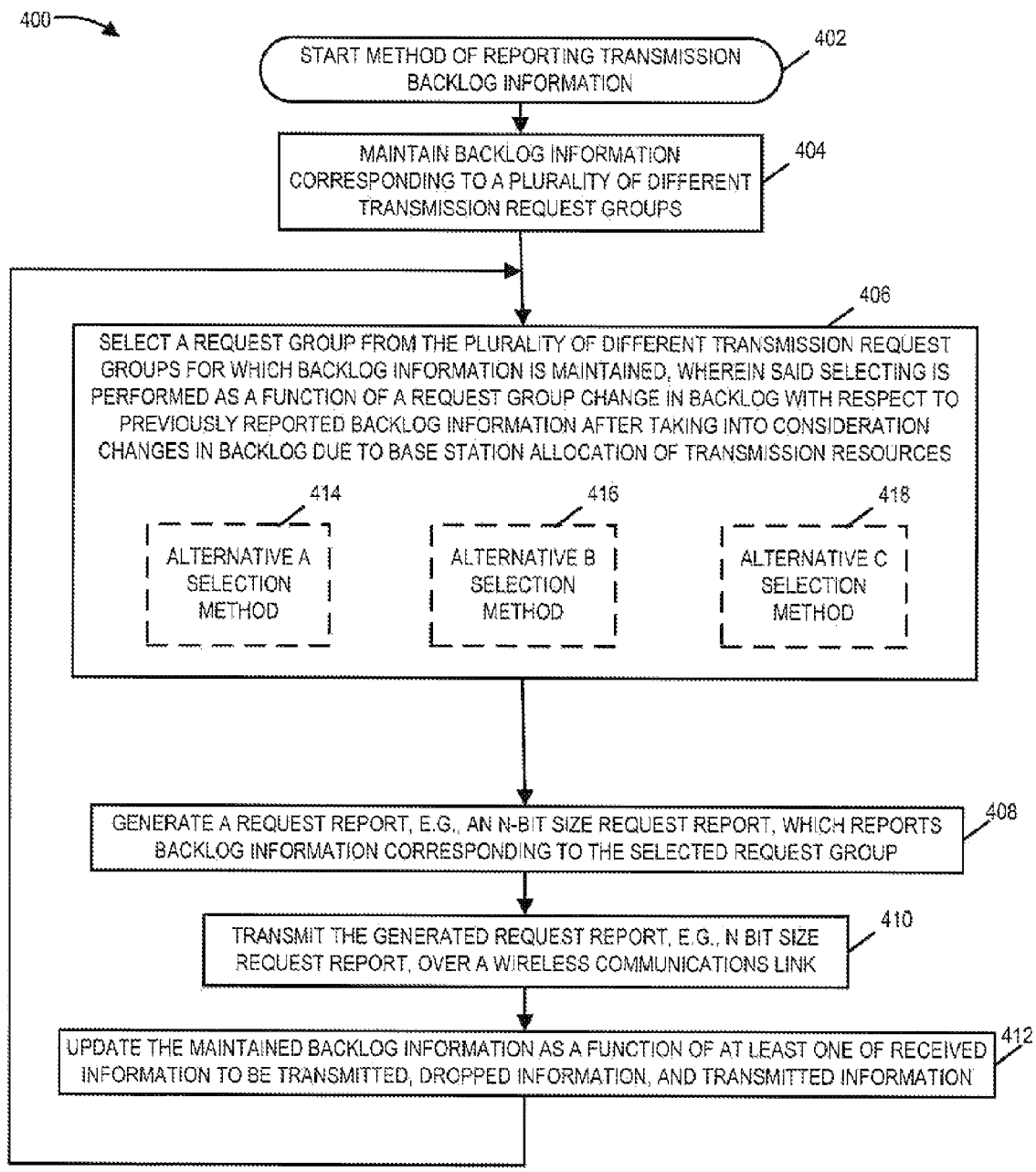
FIG. 4 comprising the combination of FIG. 4A, FIG. 4B, FIG. 4C
FIG. 4D is a drawing of a flowchart of an exemplary method of reporting transmission backlog information.
Figure 4B:
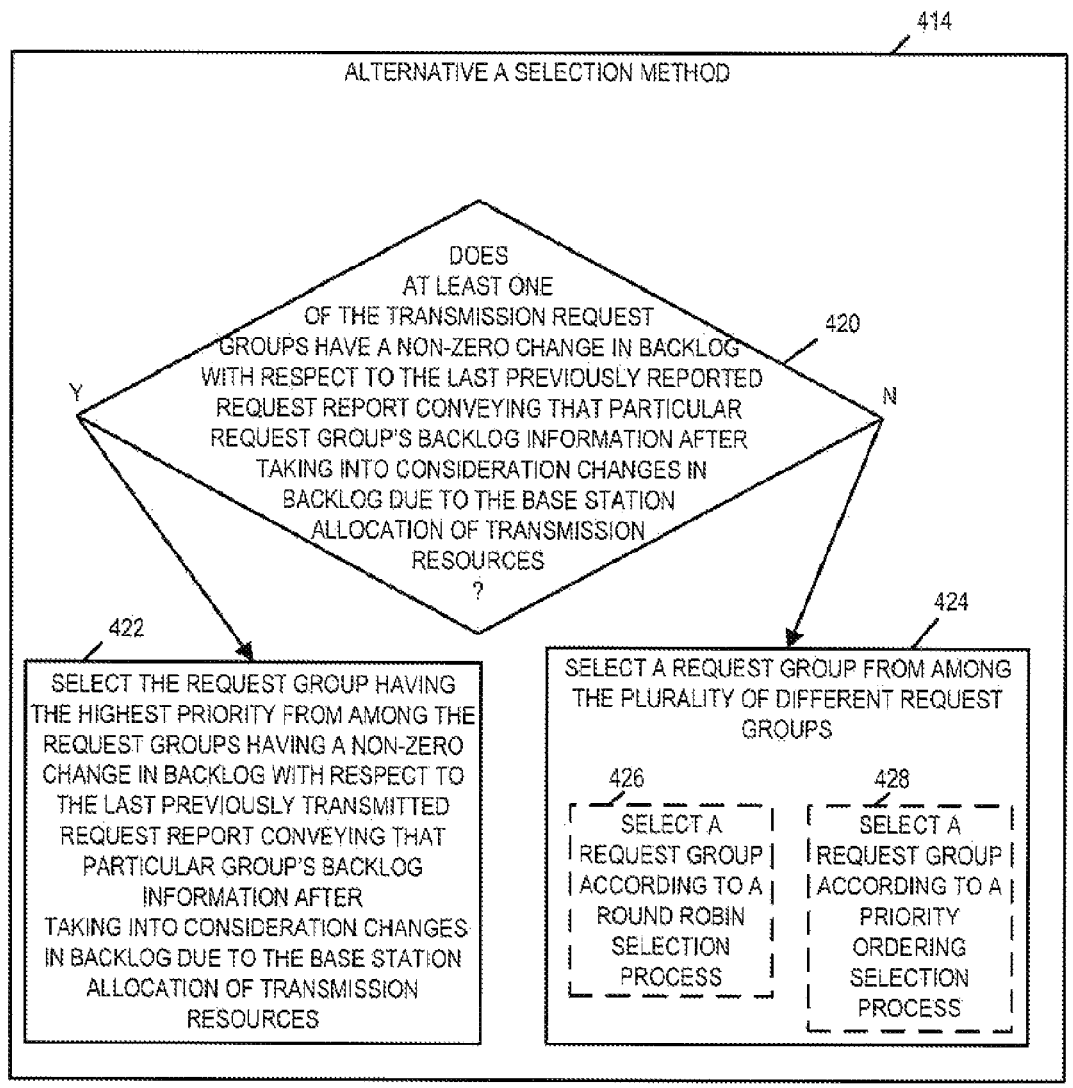
Figure 4C:
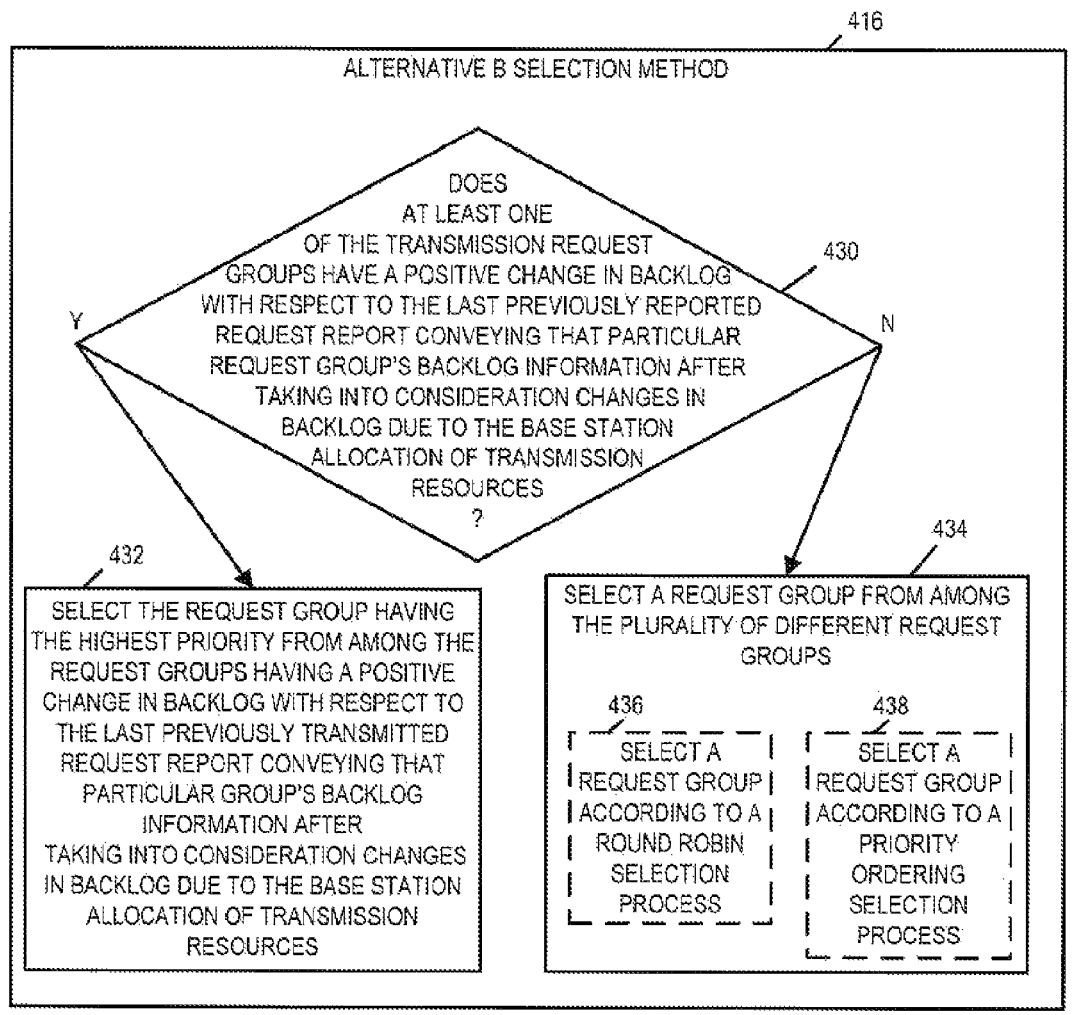
Figure 4D:
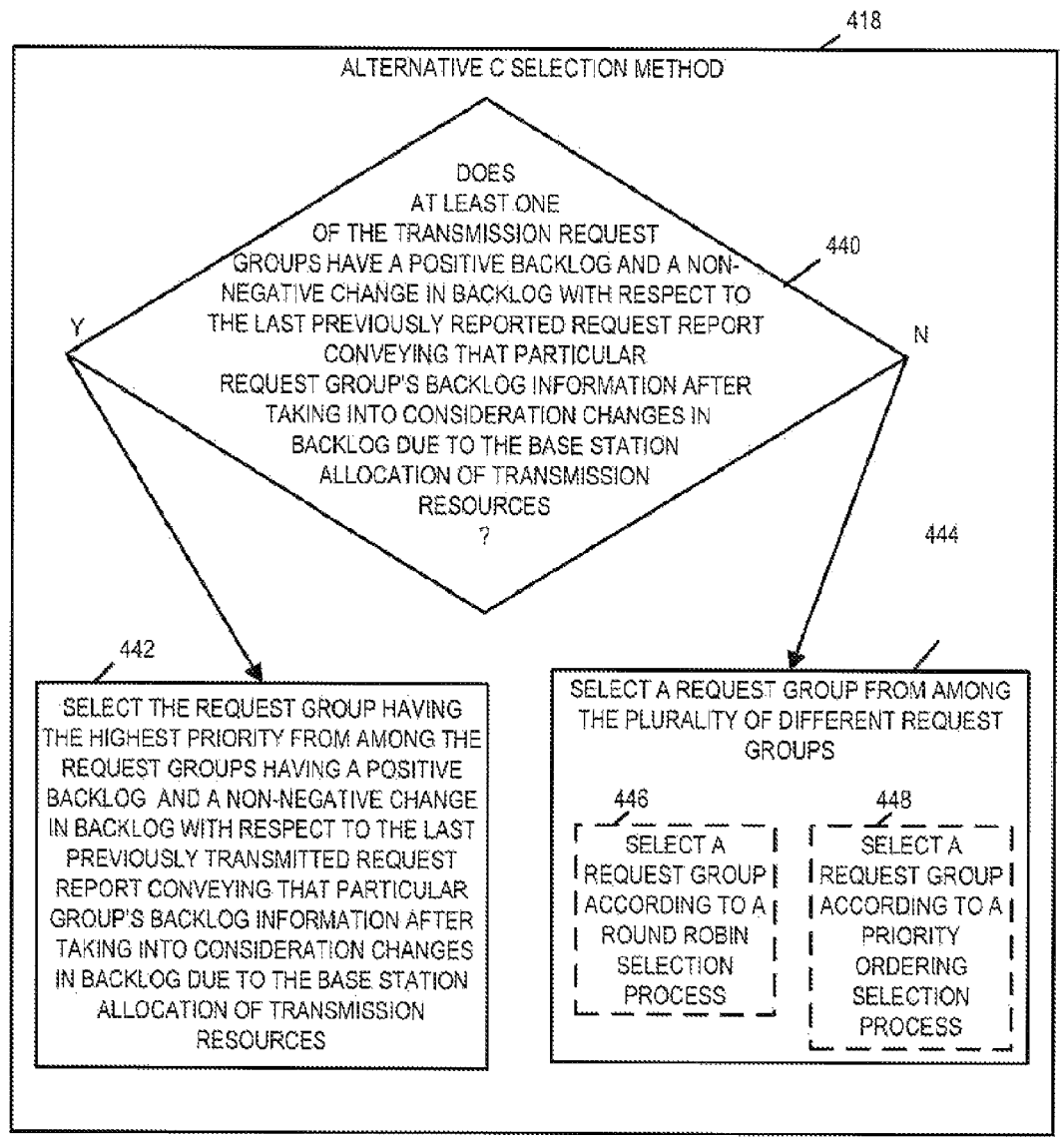

FIG. 3 is a drawing of an exemplary base station 300 in accordance with various embodiments. Exemplary base station 300 may be any of the exemplary base stations (BS 1 102, . . . , BS M 104) of system 100 of FIG. 1. Base station 300 includes a receiver module 304, a transmitter module 308, a processor 310, an I/O interface 312, and a memory 314 coupled together via a bus 316 over which the various elements may interchange data and information. Memory 314 includes routines 318 and data/information 320. The processor 310, e.g., a CPU, executes the routines 318 and uses the data/information 320 in memory 314 to control the operation of the base station 300 and implement methods.

Receiver module 304, e.g., an OFDM receiver, is coupled to receive antenna 302 via which the base station 300 receives uplink signals from wireless terminals, said received uplink signals including dedicated control channel segment signals, at least some of the dedicated control channel segment signal conveying traffic channel request reports. Received uplink signals also include traffic channel segment signals. Transmitter module 308, e.g., an OFDM transmitter, is coupled to transmit antenna 306 via which the base station transmits downlink signals to wireless terminals, said downlink signals including assignment signals conveying assignments for uplink traffic channel segments. I/O interface 312 couples the base station to other network node, e.g., other base stations and/or the Internet. Thus I/O interface 312, by coupling the base station 300 to a backhaul network allows a wireless terminal using an attachment point of base station 300 to participate in a communications session with a peer node, e.g., another wireless terminal, using a different base station as its point of network attachment.

Routines 318 include a request report information recovery module 322, a scheduler module 324, a request group inference module 326 and a request group updating module 327. Request report information recovery module 322 uses data/information 320 including N bit size request report format information 334 to obtain recovered information from a received request report, e.g., a 4 bit request report for traffic channel resources communicated in an uplink dedicated control channel segment. For example corresponding to WT 1, the recovered information includes recovered information from processed request report 342. The information bits of the request report may be one of a plurality, e.g., 16, of different patterns, and the particular bit pattern is interpreted to mean that one request group or a set of request groups has a certain number of frames in backlog or has a number of frames within a range in its backlog. For example consider an example where the request report format corresponds to that of FIG. 10, bit pattern=0010 may signify that request group 1 has 2 frames in its backlog waiting to be transmitted.

Scheduler module 324 schedules uplink and downlink traffic channel segments to wireless terminals. For example, scheduler module 324 schedules uplink traffic channel segments in response to received requests communicated in fixed bit size uplink traffic channel request reports, e.g., ULRQST4 reports, from wireless terminals in an On-state operation using the base station 300 as a current point of network attachment. Assigned uplink traffic channel segment information 350 corresponds to scheduler 324 assignments for WT 1, e.g., information identifying particular indexed uplink traffic channel segments assigned to WT 1.

Request group inference module 326 performs inferences about request groups not directly reported in the received request report. For example, consider that the predetermined request group priority information 336 identifies that request group 1 has a higher predetermined priority than request group 2 or request group 3, and the reporting rules are such that a wireless terminal reports the backlog of the highest priority group with a positive delta backlog after taking into consideration base station knowledge, e.g., base station previous allocation of uplink segments. If in such a situation, the base station received a report which conveyed, information about request group 2, the base station could infer that request group 1 does not have a positive delta backlog.

Request group updating module 327 uses the recovered information, e.g., info 342, obtained from recovery module 322 and the inferred information, e.g., info 344, obtained from inference module 326 to update the set of request group information corresponding to the wireless terminal, e.g., (request group 1 information 346, . . . , request group m information 348). For example, request group updating module 327 loads new request group frame counts, modifies request frame counts, and/or clears request group counts with regard to one or more of request group information sets, e.g., (request group 1 information 346, . . . , request group m information 348).

Data/information 320 includes a plurality of sets of wireless terminal data/information (WT 1 data/information 328, . . . , WT N data/information 330), dedicated control channel reporting structure information 332, N bit size request report format information 334, and predetermined request group priority information 336. WT 1 data/information 328 includes recovered information from processed request report 342, inferred information regarding request groups 344, a plurality of sets of request group information (request group 1 information 346, . . . , request group m information 348), and assigned uplink traffic channel segment information 350.

N bit size, e.g., 4 bit size, report format information 334 includes interpretation information for a plurality of bit patterns (interpretation information for bit pattern 1 338, . . . , interpretation information for bit pattern $2^N$ 340). For example in one exemplary embodiment, where N=4 there are 16 distinct bit patterns (0000, 0001, . . . , 1111) where each bit pattern has a different interpretation of the information being conveyed in the report.

Predetermined request group priority information 336 includes information associating different uplink traffic request groups with different predetermined priorities. In some embodiments, different wireless terminals have different priorities orderings associated with the request groups being used.

Dedicated control channel (DCCH) reporting structure information 332 includes information identifying DCCH logical channel tones, DCCH segments, mapping of different types of reports to segments, and associated timing in a recurring reporting structure. The different types of reports in the DCCH reporting structure include a request report type in accordance with the N bit size request report format information 334.

FIG. 4 comprising the combination of FIG. 4A, FIG. 4B, FIG. 4C and FIG. 4D is a drawing of a flowchart 400 of an exemplary method of reporting transmission backlog information that may be implemented by a wireless communications device. For example, an exemplary wireless terminal such as a mobile node in an exemplary OFDM multiple access wireless communications system, may implement the method of flowchart 400 to report backlog information about different transmission request requests for uplink traffic to a base station. In some embodiments, each request group corresponds to a request group queue used to store information to be transmitted. The exemplary method is started in step 402, e.g., where the communications device is powered on and initialized. Operation proceeds from start step 402 to step 404.

In step 404, the communications device maintains backlog information corresponding to a plurality of different transmission request groups. Backlog information includes, e.g., counts of frames, e.g., counts of MAC frames, waiting to be transmitted corresponding to a request group. Operation proceeds from step 404 to step 406.

In step 406, the communications device selects a request group from the plurality of different transmission request groups for which backlog information is maintained, wherein said selecting is performed as a function of a request group change in backlog with respect to previously reported backlog information after taking into consideration changes in backlog due to base station allocation of transmission resources. In step 406 three exemplary alternative selection methods are included (alternative A selection method 414, alternative B selection method 416, alternative C selection method 418).

In alternative A selection method 414 (See FIG. 4B), the communications device determines in sub-step 420 if at least one of the transmission request groups have a non-zero change in backlog with respect to the last previously reported request report conveying that particular request group's backlog information after taking into consideration changes in backlog due to the base station allocation of transmission resources. If it is determined in sub-step 420 that at least one of the request groups has a non-zero change operation proceeds from sub-step 420 to sub-step 422; otherwise, operation proceeds from sub-step 420 to sub-step 424.

In sub-step 422, the communications device selects the request group having the highest priority from among the request groups having a non-zero change in backlog with respect to the last previously transmitted request report conveying that particular request group's backlog information after taking into consideration changes in backlog due to the base station allocation of transmission resources. In sub-step 424, the communication device selects a request group from among the plurality of different request groups. Sub-step 424 includes two alternative sub-steps, sub-step 426 and sub-step 428. In sub-step 426, the communications device selects a request group according to a round robin selection process. In sub-step 428, the communications device selects a request group according to a priority ordering selection process.

In alternative B selection method 416 (See FIG. 4C), the communications device determines in sub-step 430 if at least one of the transmission request groups have a positive change in backlog with respect to the last previously reported request report conveying that particular request group's backlog information after taking into consideration changes in backlog due to the base station allocation of transmission resources. If it is determined in sub-step 430 that at least one of the request groups has a positive change operation proceeds from sub-step 430 to sub-step 432; otherwise, operation proceeds from sub-step 430 to sub-step 434.

In sub-step 432, the communications device selects the request group having the highest priority from among the request groups having a positive change in backlog with respect to the last previously transmitted request report conveying that particular request group's backlog information after taking into consideration changes in backlog due to the base station allocation of transmission resources. In sub-step 434, the communication device selects a request group from among the plurality of different request groups. Sub-step 434 includes two alternative sub-steps, sub-step 436 and sub-step 438. In sub-step 436, the communications device selects a request group according to a round robin selection process. In sub-step 438, the communications device selects a request group according to a priority ordering selection process.

In alternative C selection method 418 (See FIG. 4D), the communications device determines in sub-step 440 if at least one of the transmission request groups have a positive backlog and a non-negative change in backlog with respect to the last previously reported request report conveying that particular request group's backlog information after taking into consideration changes in backlog due to the base station allocation of transmission resources. If it is determined in sub-step 440 that at least one of the request groups has a positive backlog and a non-negative change in backlog operation proceeds from sub-step 440 to sub-step 442; otherwise, operation proceeds from sub-step 440 to sub-step 444.

In sub-step 442, the communications device selects the request group having the highest priority from among the request groups having a positive backlog and a non-negative change in backlog with respect to the last previously transmitted request report conveying that particular request group's backlog information after taking into consideration changes in backlog due to the base station allocation of transmission resources. In sub-step 444, the communication device selects a request group from among the plurality of different request groups. Sub-step 444 includes two alternative sub-steps, sub-step 446 and sub-step 448. In sub-step 446, the communications device selects a request group according to a round robin selection process. In sub-step 448, the communications device selects a request group according to a priority ordering selection process.

Returning to FIG. 4A, operation proceeds from step 406 to step 408. In step 408, the communications device generates a request report, e.g., an N bit size uplink request report, which reports backlog information corresponding to the selected request group. In some embodiments, the selected request group corresponds to one of a plurality of supported reporting alternatives of an n bit size request report format, different reporting alternatives corresponding to different request groups, and the generated n-bit size request report is in accordance with the n-bit size request report format and said reporting alternative corresponding to the selected request group.

Operation proceeds from step 408 to step 410. In step 410, the communications device transmits the generated request report, e.g., N bit size request report, over a wireless communications link.

Operation proceeds from step 410 to step 412. In step 412, the communications device updates the maintained backlog information as a function of at least one of received information to be transmitted, dropped information, and transmitted information. Operation proceeds from step 412 to step 406, where the communication device performs another request group selection, e.g., for another request report to be transmitted.

FIG. 5 comprising the combination of FIG. 5A, FIG. 5B, FIG. 5C, FIG. 5D, FIG. 5E and FIG. 5F is a drawing of a flowchart 500 of an exemplary method of operating a wireless communications device to report transmission backlog information. For example, an exemplary wireless terminal such as a mobile node in an exemplary OFDM multiple access wireless communications system, may implement the method of flowchart 500 to report backlog information about three different transmission request groups for uplink traffic to a base station. Operation starts in step 502 where the communications device is powered on and initialized. Operation proceeds from start step 502 to step 504 and step 508.

In step 508, the communications device maintains backlog information corresponding to a plurality of different transmission request groups. In this example, the wireless terminal maintains backlog information 505 corresponding to request group 1 (RG1), request group 2 (RG2), and request group 3 (RG3). Each request group (RG1, RG2, RG3) corresponds to a request group queue used to store information to be transmitted e.g., uplink traffic to be transmitted. Backlog information 505 includes, e.g., frames counts of backlog to be transmitted, e.g., MAC frames of backlog, corresponding the request groups where N[1] is the frame count for RG1, N[2] is the frame count for RG2, and N[3] is the frame count for RG3. Backlog information 505 also includes delta information corresponding to the request groups: ΔN[1] corresponding to RG1, ΔN[2] corresponding to RG2, and ΔN[3] corresponding to RG3, where a delta indicates a change with respect to the last previously reported request report conveying that particular request group's backlog information after taking into consideration changes in backlog expected to be known to the base station, e.g., changes in backlog due to base station allocation of transmission resources.

Operation proceeds from step 504 to step 506. In step 506, the communications device updates the maintained backlog information 505 as a function of at least one of received information to be transmitted, dropped information, and transmitted information. Step 506 is performed on an ongoing basis.

Operation proceeds from start step 502 to step 508, for each of a plurality of reporting opportunities which report selection including request group 1, request group 2, and request group 3 consideration. For example, each opportunity, in some embodiments, is a multi-bit e.g., 4 bit, uplink traffic channel request report opportunity in a dedicated control channel reporting structure. Step 508 uses backlog information 505 as input. Step 508 directs operation to a report selection subroutine. Drawing 509 of FIG. 5B is a flowchart of an exemplary report selection subroutine, alternative 1 report selection subroutine. Drawing 511 of FIG. 5C is a flowchart of another exemplary report selection subroutine, alternative 2 report selection subroutine. Drawing 535 of FIG. 5D is a flowchart of still another exemplary report selection subroutine, alternative 3 report selection subroutine.

Exemplary alternative 1 report selection subroutine of FIG. 5B will now be described. Operation of alternative 1 report selection subroutine starts in step 516, e.g., where the subroutine receives backlog information 505 including delta count information corresponding to the request groups. Operation proceeds from start step 516 to step 518.

In step 518, the communications device determines whether the delta count associated with request group 1 is equal to zero. If it is determined in step 518 that ΔN[1] is not equal to zero, then operation proceeds to step 520 where the communication device selects RG1 as the selected request group; otherwise operation proceeds from step 518 to step 522.

In step 522, the communications device determines whether the delta count associated with request group 2 is equal to zero. If it is determined in step 522 that ΔN[2] is not equal to zero, then operation proceeds to step 524 where the communication device selects RG2 as the selected request group; otherwise operation proceeds from step 522 to step 526.

In step 526, the communications device determines whether the delta count associated with request group 3 is equal to zero. If it is determined in step 526 that ΔN[3] is not equal to zero, then operation proceeds to step 528 where the communication device selects RG3 as the selected request group; otherwise operation proceeds from step 526 to step 530.

In step 530, operation is directed to a default selection subroutine. Flowchart 531 of FIG. 5E is a flowchart of a first alternative default selection subroutine using a priority ordered selection process. Flowchart 535 of FIG. 5D is a flowchart of a second alternative default selection subroutine using a round robin selection process.

Operation proceeds to step 534, where operation returns from a default selection subroutine, e.g., from step 554 or step 576, with an identified selected request group or an indication of no backlog. Operation proceeds from one of steps 520, 524, 534, and 528 to step 536. In step 536, the report selection subroutine ends and the subroutine returns an identified selected request group or an indication of no backlog.

Exemplary alternative 2 report selection subroutine of FIG. 5C will now be described. Operation of alternative 2 report selection subroutine starts in step 513, e.g., where the subroutine receives backlog information 505 including delta count information corresponding to the request groups. Operation proceeds from start step 513 to step 515.

In step 515, the communications device determines whether the delta count associated with request group 1 is greater than zero. If it is determined in step 515 that ΔN[1] is greater than zero, then operation proceeds to step 519 where the communication device selects RG1 as the selected request group; otherwise operation proceeds from step 515 to step 517.

In step 517, the communications device determines whether the delta count associated with request group 2 is greater than zero. If it is determined in step 517 that ΔN[2] is greater than zero, then operation proceeds to step 523 where the communication device selects RG2 as the selected request group; otherwise operation proceeds from step 517 to step 521.

In step 521, the communications device determines whether the delta count associated with request group 3 is greater than zero. If it is determined in step 521 that ΔN[3] is greater than zero, then operation proceeds to step 525 where the communication device selects RG3 as the selected request group; otherwise operation proceeds from step 521 to step 527.

Figure 5F:
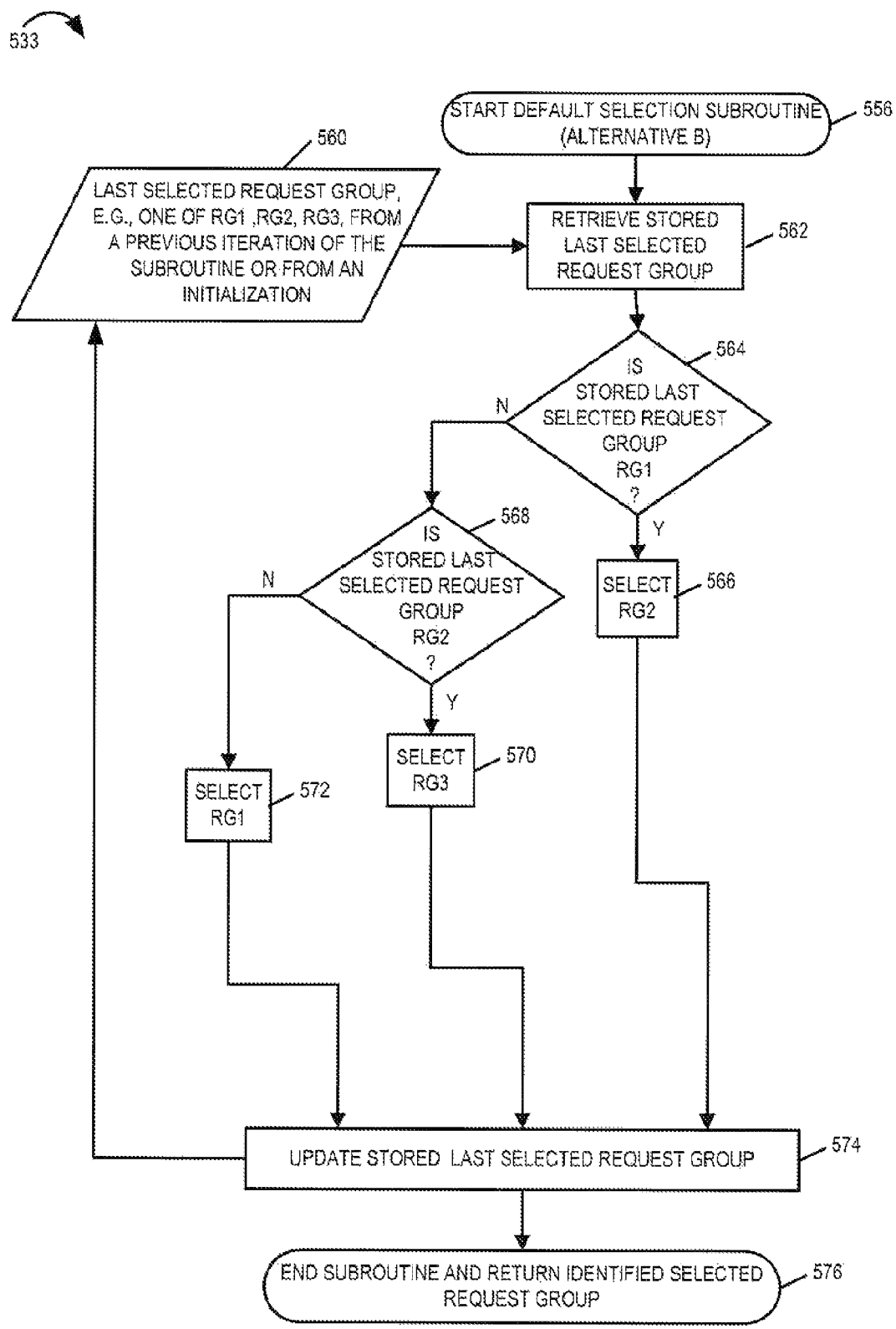

In step 527, operation is directed to a default selection subroutine. Flowchart 531 of FIG. 5E is a flowchart of a first alternative default selection subroutine using a priority ordered selection process. Flowchart 533 of FIG. 5F is a flowchart of a second alternative default selection subroutine using a round robin selection process.

Operation proceeds to step 529, where operation returns from a default selection subroutine, e.g., from step 554 or step 576, with an identified selected request group or an indication of no backlog. Operation proceeds from one of steps 519, 523, 525, and 529 to step 531. In step 531, the report selection subroutine ends and the subroutine returns an identified selected request group or an indication of no backlog.

Exemplary alternative 3 report selection subroutine of FIG. 5D will now be described. Operation of alternative 3 report selection subroutine starts in step 537, e.g., where the subroutine receives backlog information 505 including count information and delta count information corresponding to the request groups. Operation proceeds from start step 537 to step 539.

In step 539, the communications device determines whether request group 1 has a positive backlog and whether the delta count associated with request group 1 is greater than or equal to zero. If it is determined in step 539 that N[1] is greater than 0 and ΔN[1] is greater than or equal to zero, then operation proceeds to step 543 where the communication device selects RG1 as the selected request group; otherwise operation proceeds from step 539 to step 541.

In step 541, the communications device determines whether request group 2 has a positive backlog and whether the delta count associated with request group 2 is greater than or equal to zero. If it is determined in step 541 that N[2] is greater than 0 and ΔN[2] is greater than or equal to zero, then operation proceeds to step 547 where the communication device selects RG2 as the selected request group; otherwise operation proceeds from step 541 to step 545.

In step 545, the communications device determines whether request group 3 has a positive backlog and whether the delta count associated with request group 3 is greater than or equal to zero. If it is determined in step 545 that N[3] is greater than 0 and ΔN[3] is greater than or equal to zero, then operation proceeds to step 549 where the communication device selects RG3 as the selected request group; otherwise operation proceeds from step 545 to step 551.

In step 551, operation is directed to a default selection subroutine. Flowchart 531 of FIG. 5E is a flowchart of a first alternative default selection subroutine using a priority ordered selection process. Flowchart 533 of FIG. 5F is a flowchart of a second alternative default selection subroutine using a round robin selection process.

Operation proceeds to step 553, where operation returns from a default selection subroutine, e.g., from step 554 or step 576, with an identified selected request group or an indication of no backlog. Operation proceeds from one of steps 543, 547, 549, and 553 to step 555. In step 555, the report selection subroutine ends and the subroutine returns an identified selected request, group or an indication of no backlog.

The exemplary method of default selection subroutine (alternative A) of flowchart 531 of FIG. 5E will now be described. Operatic of the default selection subroutine starts in step 538 and proceeds to step 540. In step 540, the communication device determines whether the frame count corresponding to request group 1 is equal to zero. If it is determined that N[1]=0 operation proceeds from step 540 to step 544; otherwise operation proceeds from step 540 to step 542, where the communication device selects RG1 as the selected request group.

In step 544, the communication device determines whether the frame count corresponding to request group 2 is equal to zero. If it is determined that N[2]=0 operation proceeds from step 544 to step 548; otherwise operation proceeds for step 544 step 546, where the communication device selects RG2 as the selected request group.

In step 548, the communication device determines whether the frame count corresponding to request group 3 is equal to zero. If it is determined that N[3]=0 operation proceeds from step 548 to step 552; otherwise operation proceeds from step 548 to step 550, where the communication device selects RG3 as the selected request group. In step 552, the subroutine provides an indication of no backlog corresponding to RG1, RG2 and RG3.

Operation proceeds from one of steps 542, 546, 550 and 552 to step 554. In step 554, the subroutine ends and returns an identified selected request group or an indication of no backlog.

The exemplary method of default selection subroutine (alternative B) of flowchart 533 of FIG. 5F will now be described. Operation of the default selection subroutine starts in step 556 and proceeds to step 562. In step 562, the subroutine retrieves the stored last selected request group from stored information 560, e.g., the last selected request group selected by this subroutine on a previous iteration of the subroutine or an initialization value if this happens to be a first iteration of the subroutine.

Operation proceeds from step 562 to step 564. In step 564, it is determined whether the stored last selected request group was RG1. If it is determined in step 564, that the stored last selected request group is RG1, then operation proceeds to step 566, where the subroutine selects RG2 as the selected request group; otherwise operation proceeds to step 568.

In step 568, it is determined whether the stored last selected request group was RG2. If it is determined in step 568, that the stored last selected request group is RG2, then operation proceeds to step 570, where the subroutine selects RG3 as the selected request group; otherwise operation proceeds to step 572. In step 572, the subroutine selects RG1 as the selected request group, since by default RG3 was the stored last selected request group.

Operation proceeds from one of steps 566, 570, and 572 to step 574. In step 574, the subroutine updates the stored last selected request group in information 560 based on the selection of the one of steps 566, 570 and 572. Operation proceeds from step 574 to step 576, where the subroutine ends and the subroutine returns the identified selected request group.

Returning to FIG. 5A, operation proceeds to step 510, where operation returns from the report selection subroutine e.g., from one of step 536, step 531 and 555, with an identified selected request group or an indication to report no backlog. In some embodiments, the selected request group corresponds to one of a plurality of supported reporting alternatives of all n-bit size request report, different reporting alternatives corresponding to different request groups. For example, the n-bit size report may be a 4 bit report with 16 alternative possible 4 bit bit patterns, and a first reporting alternative associated with reporting request group 1 backlog may include a first subset of those 16 bit patterns, a second reporting alternative associated with reporting request group 2 backlog may include a second subset of those 16 bit patterns, and a third reporting alternative associated with reporting request group 3 backlog may include a third subset of those 16 bit patterns, where said first, second, and third subsets are non-overlapping.

Then, in step 512, the communications device generates a request report, e.g., an N-bit size request report, which reports backlog information corresponding to the selected request group or reports no backlog. In some embodiments, the generated n-bit size request report is in accordance with the n-bit size request report format and said reporting alternative corresponding to the selected request group.

Operation proceeds front step 512 to step 514. In step 514, the communication device transmits the generated request report, e.g., an N bit size request report, over a wireless communications link.

In some embodiments, the number of request groups under consideration for selection is two. In some embodiments, the number of request groups under consideration for selection is a number greater than three, e.g., four, five six, seven, eight, or nine.

FIG. 6 is a drawing 600 of exemplary uplink dedicated control channel (DCCH) segments in an exemplary uplink timing and frequency structure in an exemplary orthogonal frequency division multiplexing (OFDM) multiple access wireless communications system. The uplink dedicated control channel is used to send Dedicated Control Reports (DCR) from wireless terminals to base stations. Vertical axis 602 plots logical uplink tone index while horizontal axis 604 plots the uplink index of the halfslot within a beaconslot. In this example, an uplink tone block includes 113 logical uplink tones indexed (0, . . . , 112); there are seven successive OFDM symbol transmission the periods within a halfslot, 2 additional OFDM symbol time periods followed by 16 successive half-slots within a superslot, and 8 successive superslots within a beacon slot. The first 9 OFDM symbol transmission time periods within a superslot are an access interval, and the dedicated control channel does not use the air link resources of the access interval.

The exemplary dedicated control channel is subdivided into 31 logical tones (uplink tone index 81 606, uplink tone index 82 608, . . . , uplink tone index 111 610). Each logical uplink tone (81, . . . , 111) in the logical uplink frequency structure corresponds to a logical tone indexed with respect to the DCCH channel (0, . . . , 30).

For each tone in the dedicated control channel there are 40 segments in the beaconslot corresponding to forty columns (612, 614, 616, 618, 620, 622, . . . , 624). The segment structure repeats on a beaconslot basis. For a given tone in the dedicated control channel there are 40 segments corresponding to a beaconslot 628; each of the eight superslots of the beaconslot includes 5 successive segments for the given tone. For example, for first superslot 626 of beaconslot 628, corresponding to tone 0 of the DCCH, there are five indexed segments (segment [0][0], segment [0][1], segment [1][2], segment [0][3], segment [0][4]). Similarly, for first superslot 626 of beaconslot 628, corresponding to tone 1 of the DCCH, there are five indexed segments (segment [1][0], segment [1][1], segment [1][2], segment [1][3], segment [1][4]). Similarly, for first superslot 626 of beaconslot 628, corresponding to tone 30 of the DCCH, there are five indexed segments (segment [30][0], segment [30][1], segment [30][2], segment [30][3], segment [30][4]).

In this example each segment, e.g., segment [0][0], comprises one tone for 3 successive half-slots, e.g., representing an allocated uplink resource of 21 OFDM tone-symbols. In some embodiments, logical uplink tones are hopped to physical tones in accordance with an uplink tone hopping sequence such that the physical tone associated with a logical tone may be different for successive half-slots, but remains constant during a given half-slot.

Each logical tone of the dedicated control channel may be assigned by the base station to a different wireless terminal using the base station as its current point of attachment. For example, logical tone (606, 608, . . . , 610) may be currently assigned to (WT A 630, WT B 632, . . . , WT N' 634), respectively.

Each uplink DCCH segment is used to transmit a set of Dedicated Control Channel Reports (DCRs). A list of exemplary DCRs is given in table 700 of FIG. 7. First column 702 of table 700 describes abbreviated names used for each exemplary report. The name of each report ends with a number which specifies the number of bits of the DCR. Second column 704 of table 700 briefly describes each named report.

FIG. 8 is a drawing 899 illustrating an exemplary reporting format information in an exemplary beaconslot for a given DCCH tone, e.g., corresponding to a wireless terminal. In FIG. 8, each block (800, 801, 802, 803, 804, 805, 806, 807, 808, 809, 810, 811, 812, 813, 814, 815, 816, 817, 818, 819, 820, 821, 822, 823, 824, 825, 826, 827, 828, 829, 830, 831, 832, 833, 834, 835, 836, 837, 838, 839) represents one segment whose index s2 (0, . . . , 39) is shown above the block in rectangular region 840. Each block, e.g., block 800 representing segment 0, conveys 6 information bits; each block comprises 6 rows corresponding to the 6 bits in the segment, where the bits are listed from the most significant bit to the least significant bit downwards from the top row to the bottom row as shown in rectangular region 843.

FIG. 9 is a drawing 900 including a table 902 describing an exemplary format of exemplary 4 bit uplink traffic request report (ULRQST4) and a column 904 describing reporting alternatives. Column 906 of table 902 lists the 16 possible information bit patterns for the report, and column 908 lists reported backlog information conveyed corresponding to each of the possible bit patterns. For example, N[1]=2 indicates that request group 1 has two frames in its backlog to be transmitted; N[2]=4.5 indicates that request group 2 has 4 or 5 frames in its backlog to be transmitted; N[3]>=33 indicates that request group 3 has 33 or more frames in its backlog. Column 904 indicates that reporting alternative A reports that, request groups 1, 2, and 3 have no backlog and corresponds to the bit pattern 0000. Column 904 also indicates that: reporting alternative B reports on request group 1 backlog and corresponds to bit patterns (0001, 0010 and 0011); reporting alternative C reports on request group 2 backlog and corresponds to bit patterns (0100, 0101, 0110 and 0111); and reporting alternative D reports on request group 3 backlog and corresponds to bit patterns (1000, 1001, 1010, 1011, 1100, 1101, 1110 and 0111).

FIG. 10 is a drawing 1000 including a table 1002 describing another exemplary format of exemplary 4 bit uplink traffic request report (ULRQST4) and a column 1004 describing reporting alternatives. Column 1006 of table 1002 lists the 16 possible information bit patterns for the reports and column 1008 lists reported backlog information conveyed corresponding to each of the possible bit patterns. For example, N[1]=0 indicates that request group 1 has no frames in its backlog to be transmitted; N[2]=3:6 indicates that request group 2 has 3, 4, 5 or 6 frames in its backlog to be transmitted; N[3]>=33 indicates that request group 3 has 33 or more frames in its backlog. Column 1004 indicates that: reporting alternative A reports on request group 1 backlog and corresponds to bit patterns (0000, 0001, 0010 and 0011); reporting alternative B reports on request group 2 backlog and corresponds to bit patterns (0100, 0101, 0110 and 0111); and reporting alternative C reports on request group 3 backlog and corresponds to bit patterns (1000, 1001, 1010, 1011, 1100, 1101, 1110 and 0111).

Figure 11:
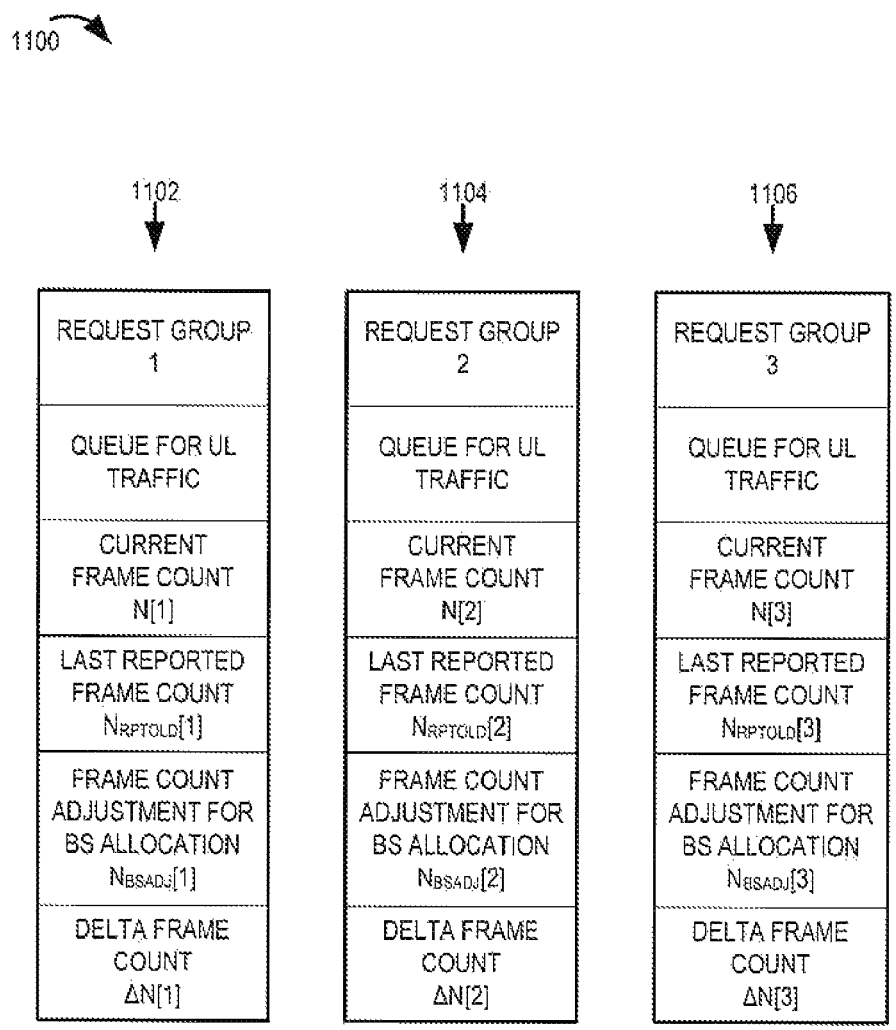
FIG. 11 is a drawing describing three exemplary request groups in an exemplary wireless terminal.

FIG. 11 is a drawing 1100 describing three exemplary request groups in an exemplary wireless terminal. In some embodiments, the information of FIG. 11 is includes as part of data/information 216 of wireless terminal 200. Column 1102 describes that request group 1 has a queue for uplink traffic a current frame count N[1] of its queue, a last reported frame count $N_{RPTOLD}[1]$, a frame count adjustment for base station allocation $N_{BSADJ}[1]$ and a delta frame count $\Delta N[1]$. The last reported frame count transmitted in a report corresponding to the request group, $N_{RPTOLD}[1]$, may have been communicated in the same type of request report, e.g., the same bit size request report, or a different type of request report, e.g., a different bit size request report. The base station adjustment value $N_{BSADJ}[1]$ may correspond to a previous assignment of an uplink traffic channel segment for conveying frames of request group 1 information. In some embodiments, $\Delta N[1]=(N[1]-N_{RPTOLD}[1])-N_{BSADJ}[1]$.

Column 1104 describes that request group 2 has a queue for uplink traffic, a current frame count N[2] of its queue, a last reported frame count $N_{RPTOLD}[2]$, a frame count adjustment for base station allocation $N_{BSADJ}[2]$ and at delta frame count $\Delta N[2]$. Column 1106 describes that request group 3 has a queue for uplink traffic, a current frame count N[3] of its queue, a last reported frame count $N_{RPTOLD}[3]$, a frame count adjustment for base station allocation $N_{BSADJ}[3]$ and a delta frame count $\Delta N[3]$.

In some embodiments, the different request groups correspond to different types of traffic. For example, in one exemplary embodiment, request group 1 corresponds to control traffic, request group 2 corresponds to voice traffic, and request group 3 corresponds to data traffic. In another exemplary embodiment, request group 1 corresponds to voice traffic, request group 2 corresponds to other time sensitive traffic, e.g. gaming traffic, and request group 3 corresponds to relatively time insensitive traffic, e.g., traffic including data file transfer traffic.

While described in the context of an OFDM system, the methods and apparatus of various embodiments, are applicable to a wide range of communications systems including many non-OFDM and/or non-cellular systems.

In various embodiments nodes described herein are implemented using one or more modules to perform the steps corresponding to one or more methods, for example, transmission backlog management, request group selection, report generation, etc. In some embodiments various features are implemented using modules. Such modules may be implemented using software, hardware or a combination of software and hardware. Many of the above described methods or method steps can be implemented using machine executable instructions such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium including machine executable instructions for causing a machine, e.g., processor and associated hardware, to perform one or more of the steps of the above-described method(s).

Numerous additional variations on the methods and apparatus described above will be apparent to those skilled in the art in view of the above descriptions. Such variations are to be considered within scope. The methods and apparatus of various embodiments may be, and in various embodiments are, used with CDMA, orthogonal frequency division multiplexing (OFDM), and/or various other types of communications techniques which may be used to provide wireless communications links between access nodes and mobile nodes. In some embodiments the access nodes are implemented as base stations which establish communications links with mobile nodes using OFDM and/or CDMA. In various embodiments the mobile nodes are implemented as notebook computers, personal data assistants (PDAs), or other portable devices including receiver/transmitter circuits and logic and/or routines, for implementing the methods of various embodiments.

What is claimed is:

1. A method of reporting transmission backlog information, the method comprising operating a mobile wireless communications device to perform the steps of:
maintaining backlog information corresponding to a plurality of different groups; and
selecting a group from the plurality of different groups for which backlog information is maintained, wherein said selecting is performed as a function of a change in backlog with respect to previously reported backlog information after taking into consideration changes in backlog due to base station allocation of transmission resources,
wherein the selected group corresponds to one of a plurality of supported reporting alternatives of an n-bit size request report format, different reporting alternatives corresponding to different groups, wherein each n-bit sized request report format comprises a table lookup for an uplink traffic channel request for up to m priority request groups and further comprises reports, each report comprising an uplink power backoff report (ULTxBKF), a downlink signal to noise ratio report (DLSNR), a downlink beacon ratio report (DLBNR), and up to four flexible reports; and
generating a n-bit size request report in accordance with the n-bit size request report format and said reporting alternative corresponding to the selected group.

2. The method of claim 1, further comprising:
transmitting the generated n-bit size request report over a wireless communications link.

3. The method of claim 1, further comprising:
updating said maintained backlog information as a function of at least one of received information to be transmitted, dropped information and transmitted information.

4. The method of claim 3, wherein each group corresponds to a group queue used to store information to be transmitted.

5. The method of claim 1, wherein said selecting includes:
selecting, when, after taking into consideration changes in backlog due to base station allocation of transmission resources, at least one of the groups has a non-zero change in backlog with respect to the last previously reported request report conveying that particular group's backlog information, the group having the highest priority from among the groups having a non-zero change in backlog with respect to the last previously reported request report.

6. The method of claim 1, wherein selecting a group from the plurality of different groups for which backlog information is maintained, includes:
selecting, when, after taking into consideration changes in backlog due to base station allocation of transmission resources, none of the individual groups have a non-zero change in backlog with respect to the last previously reported request report conveying that particular individual group's backlog information, a group from the plurality of groups according to a round robin selection process.

7. The method of claim 1, wherein selecting a group from the plurality of different groups for which backlog information is maintained, includes:
selecting, when, after taking into consideration changes in backlog due to base station allocation of transmission resources, none of the individual groups has a non-zero change in backlog with respect to the last previously reported request report conveying that particular individual group's backlog information, a group from the plurality of groups according to a priority ordering selection process.

8. The method of claim 1, wherein said selecting includes:
selecting, when, after taking into consideration changes in backlog due to base station allocation of transmission resources, at least one of the groups has a positive change in backlog with respect to the last previously reported request report conveying that particular group's backlog information, the group having the highest priority from among the groups having a positive change in backlog with respect to the last previously reported request report.

9. The method of claim 1 wherein said selecting includes:
selecting, when, after taking into consideration changes in backlog due to base station allocation of transmission resources, at least one of the groups has a positive backlog and a non-negative change in backlog with respect to the last previously reported request report conveying that particular group's backlog information, the group having the highest priority from among the groups having a positive backlog and a non-negative change in backlog with respect to the last previously reported request report.

10. The method of claim 1, wherein each of the plurality of different groups includes a request group, wherein the request group corresponds to a request group queue used to store information to be transmitted.

11. The method of claim 1, further comprising:
updating the backlog information corresponding to the plurality of different groups as a function of at least one of received information to be transmitted, dropped information and transmitted information.

12. A mobile wireless communications device, comprising:
a transmission backlog management module for maintaining backlog information corresponding to a plurality of different groups;
a selection module for selecting a group from the plurality of different groups for which backlog information is maintained, wherein said selecting is performed as a function of a change in backlog with respect to previously reported backlog information after taking into consideration changes in backlog due to base station allocation of transmission resources;
memory including n-bit size request report format information, the n-bit size request report format information supporting a plurality of reporting alternatives, different reporting alternatives corresponding to different groups, wherein each n-bit sized request report format comprises a table lookup for an uplink traffic channel request for up to m priority request groups and further comprises reports, each report comprising an uplink power backoff report (ULTxBKF), a downlink signal to noise ratio report (DLSNR), a downlink beacon ratio report (DLBNR), and up to four flexible reports; and
a report generation module for generating request report in accordance with the n-bit size request report format and said reporting alternative corresponding to the selected group.

13. The mobile wireless communications device of claim 12, further comprising:
a transmission module for transmitting the generated n-bit size request report over a wireless communications link.

14. The mobile wireless communications device of claim 12, wherein the transmission backlog management module includes:

a backlog update module for updating the maintained backlog information as a function of at least one of received information to be transmitted, dropped information and transmitted information.

15. The mobile wireless communications device of claim 14, further including:

a plurality of group queues used to store information to be transmitted, each group corresponding to a group queue.

16. The wireless communications device of claim 12, wherein said selection module includes a default selection module for selecting, a group from the plurality of groups according to a round robin selection process, when, after taking into consideration changes in backlog due to base station allocation of transmission resources, none of the individual groups have a non-zero change in backlog with respect to the last previously reported request report conveying that particular individual group's backlog information.

17. The mobile wireless communications device of claim 12, wherein said mobile wireless communications device is a mobile wireless terminal which is a hand held mobile communications device.

18. The wireless communications device of claim 12, wherein said selecting includes:

selecting, when, after taking into consideration changes in backlog due to base station allocation of transmission resources, at least one of the groups has a non-zero change in backlog with respect to the last previously reported request report conveying that particular group's backlog information, the group having the highest priority from among the groups having a non-zero change in backlog with respect to the last previously reported request report.

19. The wireless communications device of claim 12, wherein said selection module includes a default selection module for selecting, a group from the plurality of groups according to a priority ordering selection process when, after taking into consideration changes in backlog due to base station allocation of transmission resources, none of the individual groups has a non-zero change in backlog with respect to the last previously reported request report conveying that particular individual group's backlog information.

20. The wireless communications device of claim 12, wherein said selecting includes:

selecting, when, after taking into consideration changes in backlog due to base station allocation of transmission resources, at least one of the groups has a positive change in backlog with respect to the last previously reported request report conveying that particular group's backlog information, the group having the highest priority from among the groups having a positive change in backlog with respect to the last previously reported request report.

21. The wireless communications device of claim 12, wherein said selecting includes:

selecting, when, after taking into consideration changes in backlog due to base station allocation of transmission resources, at least one of the groups has a positive backlog and a non-negative change in backlog with respect to the last previously reported request report conveying that particular group's backlog information, the group having the highest priority from among the groups having a positive backlog and a non-negative change in backlog with respect to the last previously reported request report.

22. The mobile wireless communications device of claim 12, wherein each of the plurality of different groups includes a request group, wherein the request group corresponds to a request group queue used to store information to be transmitted.

23. A mobile wireless communications device, comprising:

means for maintaining backlog information corresponding to a plurality of different groups;

means for selecting a group from the plurality of different groups for which backlog information is maintained, wherein said selecting is performed as a function of a change in backlog with respect to previously reported backlog information after taking into consideration changes in backlog due to base station allocation of transmission resources;

means for storing n-bit size request report format information, the n-bit size request report format information supporting a plurality of reporting alternatives, different reporting alternatives corresponding to different groups, wherein each n-bit sized request report format comprises a table lookup for an uplink traffic channel request for up to m priority request groups and further comprises reports, each report comprising an uplink power backoff report (ULTxBKF), a downlink signal to noise ratio report (DLSNR), a downlink beacon ratio report (DLBNR), and up to four flexible reports; and means for generating a n-bit size request report in accordance with the n-bit size request report format and said reporting alternative corresponding to the selected group.

24. The mobile wireless communications device of claim 23, further comprising:

means for transmitting the generated request report over a wireless communications link.

25. The mobile wireless communications device of claim 23, wherein the means for maintaining backlog information includes:

means for updating the maintained backlog information as a function of at least one of received information to be transmitted, dropped information and transmitted information.

26. The mobile wireless communications device of claim 25, further including:

means for storing a plurality of group queues used to store information to be transmitted, each group corresponding to a group queue.

27. The mobile wireless communications device of claim 23, wherein said mobile wireless communications device is a mobile wireless terminal which is a hand held mobile communications device.

28. The wireless communications device of claim 23, wherein said selecting includes:

selecting, when, after taking into consideration changes in backlog due to base station allocation of transmission resources, at least one of the groups has a non-zero change in backlog with respect to the last previously reported request report conveying that particular group's backlog information, the group having the highest priority from among the groups having a non-zero change in backlog with respect to the last previously reported request report.

29. The wireless communications device of claim 23, wherein said means for selecting a group includes means for selecting, a group from the plurality of groups according to a round robin selection process, when, after taking into consideration changes in backlog due to base station allocation of transmission resources, none of the individual groups have a non-zero change in backlog with respect to the last previously reported request report conveying that particular individual group's backlog information.

30. The wireless communications device of claim 23, wherein said means for selecting a group includes means for selecting, a group from the plurality of groups according to a priority ordering selection process when, after taking into consideration changes in backlog due to base station allocation of transmission resources, none of the individual groups has a non-zero change in backlog with respect to the last previously reported request report conveying that particular individual group's backlog information.

31. The mobile wireless communications device of claim 23, wherein each of the plurality of different groups includes a request group, wherein the request group corresponds to a request group queue used to store information to be transmitted.

32. A non-transitory computer readable medium embodying machine executable instruction for controlling a wireless communications device to implement a method, the method comprising:
   maintaining backlog information corresponding to a plurality of different groups; and
   selecting a group from the plurality of different groups for which backlog information is maintained, wherein said selecting is performed as a function of a change in backlog with respect to previously reported backlog information after taking into consideration changes in backlog due to base station allocation of transmission resources,
   wherein the selected group corresponds to one of a plurality of supported reporting alternatives of an n-bit size request report format, different reporting alternatives corresponding to different groups, wherein each n-bit sized request report format comprises a table lookup for an uplink traffic channel request for up to m priority request groups and further comprises reports, each report comprising an uplink power backoff report (ULTxBKF), a downlink signal to noise ratio report (DLSNR), a downlink beacon ratio report (DLBNR), and up to four flexible reports, the computer readable medium further embodying machine executable instructions for:
   generating a n-bit size request report in accordance with the n-bit size request report format and the reporting alternative corresponding to the selected group.

33. The computer readable medium of claim 32, further embodying machine executable instructions for:
   controlling transmission of the generated n-bit size request report over a wireless communications link.

34. The computer readable medium of claim 32, further embodying machine executable instructions for:
   selecting, when, after taking into consideration changes in backlog due to base station allocation of transmission resources, at least one of the groups has a non-zero change in backlog with respect to the last previously reported request report conveying that particular group's backlog information, the group having the highest priority from among the groups having a non-zero change in backlog with respect to the last previously reported request report, as part of said step of selecting a group from the plurality of different groups for which backlog information is maintained.

35. The computer readable medium of claim 32, further embodying machine executable instructions for:
   selecting, when, after taking into consideration changes in backlog due to base station allocation of transmission resources, none of the individual groups have a non-zero change in backlog with respect to the last previously reported request report conveying that particular individual group's backlog information, a group from the plurality of groups according to a round robin selection process as part of said step of selecting a group from the plurality of different groups for which backlog information is maintained.

36. The computer readable medium of claim 32, further embodying machine executable instructions for:
   selecting, when, after taking into consideration changes in backlog due to base station allocation of transmission resources, none of the individual groups have a non-zero change in backlog with respect to the last previously reported request report conveying that particular individual group's backlog information, a group from the plurality of groups according to a priority ordering selection process as part of said step of selecting a group from the plurality of different groups for which backlog information is maintained.

37. The computer readable medium of claim 32, wherein each of the plurality of different groups includes a request group, wherein the request group corresponds to a request group queue used to store information to be transmitted.

38. A device comprising:
   a processor for use in a mobile wireless communications device, said processor configured to:
   maintain backlog information corresponding to a plurality of different groups; and
   select a group from the plurality of different groups for which backlog information is maintained, wherein said selecting is performed as a function of a change in backlog with respect to previously reported backlog information after taking into consideration changes in backlog due to base station allocation of transmission resources,
   wherein said selected group corresponds to one of a plurality of supported reporting alternatives of an n-bit size request report format, different reporting alternatives corresponding to different groups, wherein each n-bit sized request report format comprises a table lookup for an uplink traffic channel request for up to m priority request groups and further comprises reports, each report comprising an uplink power backoff report (ULTxBKF), a downlink signal to noise ratio report (DLSNR), a downlink beacon ratio report (DLBNR), and up to four flexible reports, and wherein the processor is further configured to:
   generate a n-bit size request report in accordance with said n-bit size request report format and said reporting alternative corresponding to the selected group.

39. The device of claim 38, wherein said processor is further configured to:
   control transmission of the generated n-bit size request report over a wireless communications link.

40. The device of claim 38, wherein said processor is further configured to:
   select, when, after taking into consideration changes in backlog due to base station allocation of transmission resources, at least one of the groups has a non-zero change in backlog with respect to the last previously reported request report conveying that particular group's backlog information, the group having the highest priority from among the groups having a non-zero change in backlog with respect to the last previously reported request report.

41. The device of claim 38, wherein said processor is further configure to:
  select, when, after taking into consideration changes in backlog due to base station allocation of transmission resources, none of the individual groups have a non-zero change in backlog with respect to the last previously reported request report conveying that particular individual group's backlog information, a group from the plurality of groups according to a round robin selection process.

42. The device of claim 38, wherein said processor is further configure to:
  select, when, after taking into consideration changes in backlog due to base station allocation of transmission resources, none of the individual groups have a non-zero change in backlog with respect to the last previously reported request report conveying that particular individual group's backlog information, a group from the plurality of groups according to a priority ordering selection process.

43. The device of claim 38, wherein each of the plurality of different groups includes a request group, wherein the request group corresponds to a request group queue used to store information to be transmitted.

* * * * *